(12) United States Patent
Ja

(10) Patent No.: US 12,135,413 B2
(45) Date of Patent: Nov. 5, 2024

(54) SYSTEM AND METHOD FOR MICROSCOPE HIGH-SPEED AUTO-FOCUSING INCLUDING AN IMAGED SUBJECT BASED ON CORRECTED CONTRAST DISTRIBUTION

(71) Applicant: ARACELI BIOSCIENCES INC., Tigard, OR (US)

(72) Inventor: Shiou-jyh Ja, Portland, OR (US)

(73) Assignee: ARACELI BIOSCIENCES INC., Tigard, OR (US)

( * ) Notice: Subject to any disclaimer, the term of this patent is extended or adjusted under 35 U.S.C. 154(b) by 0 days.

(21) Appl. No.: 18/331,077

(22) Filed: Jun. 7, 2023

(65) Prior Publication Data
US 2023/0418040 A1   Dec. 28, 2023

Related U.S. Application Data

(63) Continuation of application No. 17/808,491, filed on Jun. 23, 2022, now Pat. No. 11,714,273.

(51) Int. Cl.
*G02B 21/24* (2006.01)
*G02B 21/36* (2006.01)

(52) U.S. Cl.
CPC ......... *G02B 21/244* (2013.01); *G02B 21/367* (2013.01)

(58) Field of Classification Search
CPC ........ G01N 23/04; G02B 21/00; G02B 21/02; G02B 21/025; G02B 21/06; G02B 21/24; G02B 21/241; G02B 21/244; G02B 21/36; G02B 21/365; G02B 21/367
See application file for complete search history.

(56) References Cited

U.S. PATENT DOCUMENTS

| | | | | |
|---|---|---|---|---|
| 7,700,903 B2* | 4/2010 | Weiss | ........... | G02B 21/244 250/201.3 |
| 8,760,756 B2* | 6/2014 | Price | ........... | G02B 21/244 359/368 |
| 8,805,050 B2* | 8/2014 | Olson | ........... | G02B 21/244 382/133 |
| 8,878,923 B2* | 11/2014 | Henderson | ........... | G02B 21/244 382/199 |
| 9,176,311 B2* | 11/2015 | Yamamoto | ........... | G02B 21/14 |
| 10,678,041 B2* | 6/2020 | Oshima | ........... | H04N 23/673 |
| 10,895,730 B2* | 1/2021 | Yoshida | ........... | G02B 21/244 |
| 11,067,771 B2* | 7/2021 | Usui | ........... | G02B 21/367 |
| 11,320,642 B2* | 5/2022 | Oshima | ........... | G02B 21/367 |

(Continued)

OTHER PUBLICATIONS

Brenner, J. et al., "An Automated Microscope for Cytologic Research a Preliminary Evaluation," Journal of Histochemistry & Cytochemistry, vol. 24, No. 1, Jan. 1976, 12 pages.

(Continued)

*Primary Examiner* — John R Lee
(74) *Attorney, Agent, or Firm* — McCoy Russell LLP

(57) ABSTRACT

Methods and systems are provided for microscope auto-focusing. In one example, a method for microscope auto-focusing comprises: acquiring a plurality of contrast samples of an imaged subject; modeling a contrast distribution based on the plurality of contrast samples; acquiring an additional contrast sample based on the contrast distribution; modeling a corrected contrast distribution based on the additional contrast sample and the plurality of contrast samples; and focusing the imaged subject based on the corrected contrast distribution.

20 Claims, 7 Drawing Sheets

(56) References Cited

U.S. PATENT DOCUMENTS

| | | | | |
|---|---|---|---|---|
| 11,714,273 | B1* | 8/2023 | Ja | G02B 21/365 |
| | | | | 250/201.3 |
| 11,922,657 | B2* | 3/2024 | Eberspach | G06T 5/70 |
| 2009/0195688 | A1* | 8/2009 | Henderson | G02B 21/245 |
| | | | | 348/E5.024 |
| 2011/0249910 | A1* | 10/2011 | Henderson | G06V 10/993 |
| | | | | 382/278 |
| 2015/0070566 | A1* | 3/2015 | Yoshida | H04N 23/673 |
| | | | | 348/349 |
| 2020/0264423 | A1* | 8/2020 | Oshima | G02B 21/245 |
| 2023/0088338 | A1* | 3/2023 | Baker | G01N 15/1433 |
| | | | | 382/133 |
| 2023/0314909 | A1* | 10/2023 | DiMeo | G03B 3/10 |
| | | | | 348/345 |
| 2023/0418040 | A1* | 12/2023 | Ja | G02B 21/245 |
| 2024/0019678 | A1* | 1/2024 | Schmidt | G02B 21/365 |

OTHER PUBLICATIONS

Yazdanfar, S. et al., "Simple and Robust Image-Based Autofocusing for Digital Microscopy," Optics Express, vol. 16, No. 12, Jun. 9, 2008, 8 pages.

\* cited by examiner

SYSTEM AND METHOD FOR MICROSCOPE HIGH-SPEED AUTO-FOCUSING INCLUDING AN IMAGED SUBJECT BASED ON CORRECTED CONTRAST DISTRIBUTION

CROSS REFERENCE TO RELATED APPLICATIONS

The present application is a continuation of U.S. patent application Ser. No. 17/808,491, entitled "SYSTEM AND METHOD FOR MICROSCOPE HIGH-SPEED AUTO FOCUSING INCLUDING AN IMAGED SUBJECT BASED ON CORRECTED CONTRAST DISTRIBUTION", and filed on Jun. 23, 2022. The entire contents of the above-listed application are hereby incorporated by reference for all purposes.

FIELD

The present description relates generally to methods and systems for microscopic imaging, and in particular, to high-speed image auto-focusing in microscopy.

BACKGROUND/SUMMARY

Digital microscopy often demands acquisition of high-resolution details of the imaged subject, along with a wide-area or high-throughput imaging capability, for whole-slide imaging and high-content analysis. Microscope systems configured for high-speed imaging often include features for auto-focusing of the imaged subject. Auto-focusing may be based on indirect or direct measurement of imaging parameters. Indirect methods for auto-focusing measure physical quantities other than the image quality and often utilize particular hardware configurations and components such as a high-precision motorized stage position encoder using an optical triangulation routine, imaging laser beam convergence, multi-angle correspondence, and/or low-coherence interferometry. However, direct methods for auto-focusing often include measurement of image contrast and/or image high-frequency components directly from the acquired image content.

An imaging speed of a microscope using a direct method for auto-focusing is often based on a speed of the auto-focusing of the microscope. One approach for auto-focusing includes measuring image contrast and adjusting a distance between the imaged subject and a lens or sensor of the microscope incrementally by a fixed amount until the measured image contrast is satisfactory. Another approach is to adjust the distance between the imaged subject and the lens or sensor of the microscope by incrementally smaller amounts until the measured image contrast is satisfactory. However, the inventors herein have recognized potential issues with such configurations. As one example, adjusting the distance by the fixed amount may result in a large number of adjustments to provide satisfactory focusing of the subject and may increase a duration of the auto-focusing, which may decrease the imaging speed of the microscope. Further, during conditions in which the initial position of the subject results in poor image quality due to the subject being largely out of focus, the amount of fixed adjustments to the distance between the subject and the lens or detector may be increased which may result in slower auto-focusing. As another example, adjusting the distance by incrementally smaller amounts may have results that depend highly on the initial adjustment amount. An initial amount that is too large may overshoot and result in an undesirably high number of adjustments to reach the focus. A too-small initial amount may not reach the focus if the imaged subject is too far out of focus.

In one example, the issues described above may be addressed by a method for microscope auto-focusing comprising: acquiring a plurality of contrast samples of an imaged subject; modeling a contrast distribution based on the plurality of contrast samples; acquiring an additional contrast sample based on the contrast distribution; modeling a corrected contrast distribution based on the additional contrast sample and the plurality of contrast samples; and focusing the imaged subject based on the corrected contrast distribution.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
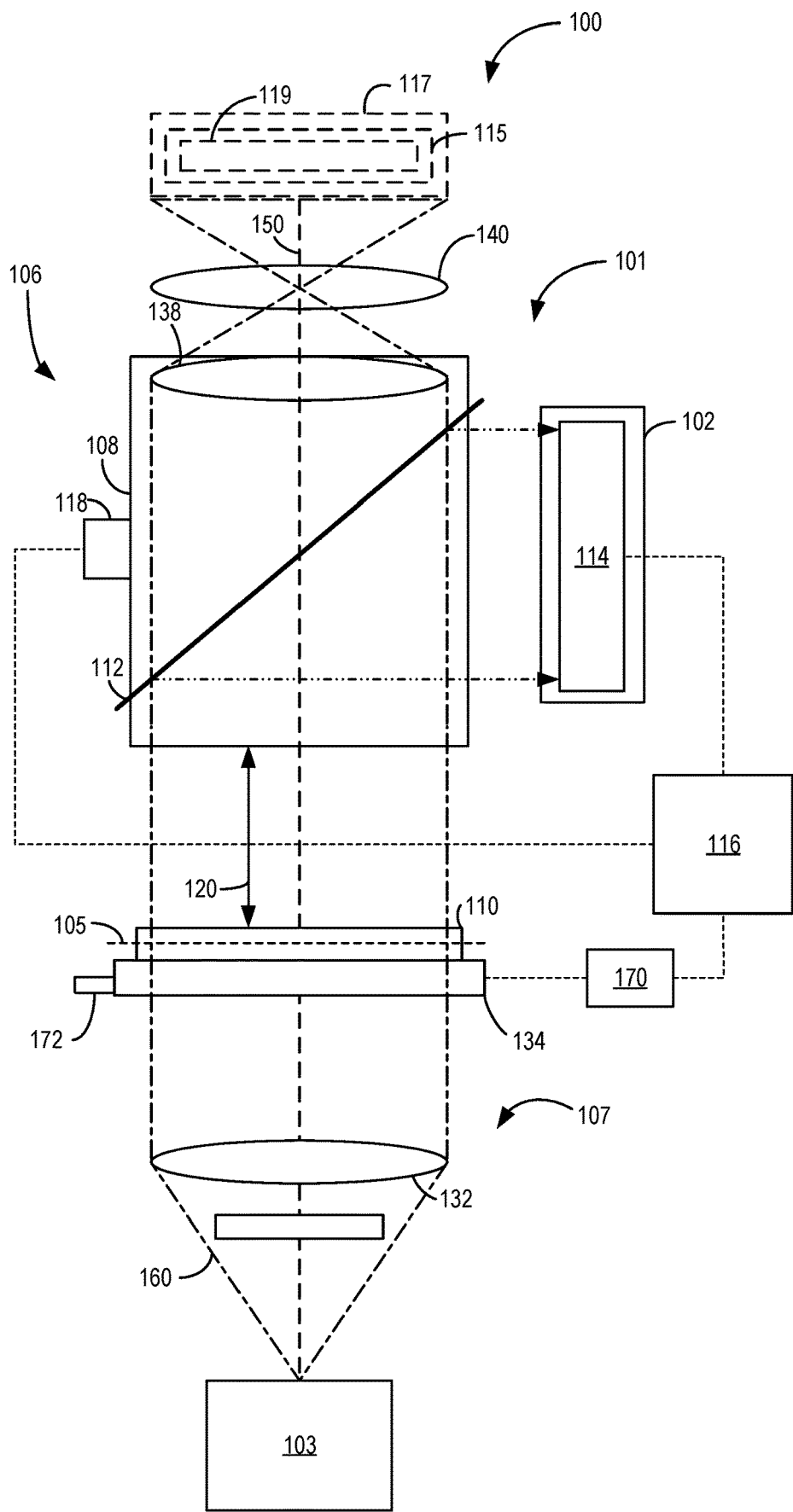
FIG. 1 shows a schematic diagram of a microscope assembly.
Figure 2:
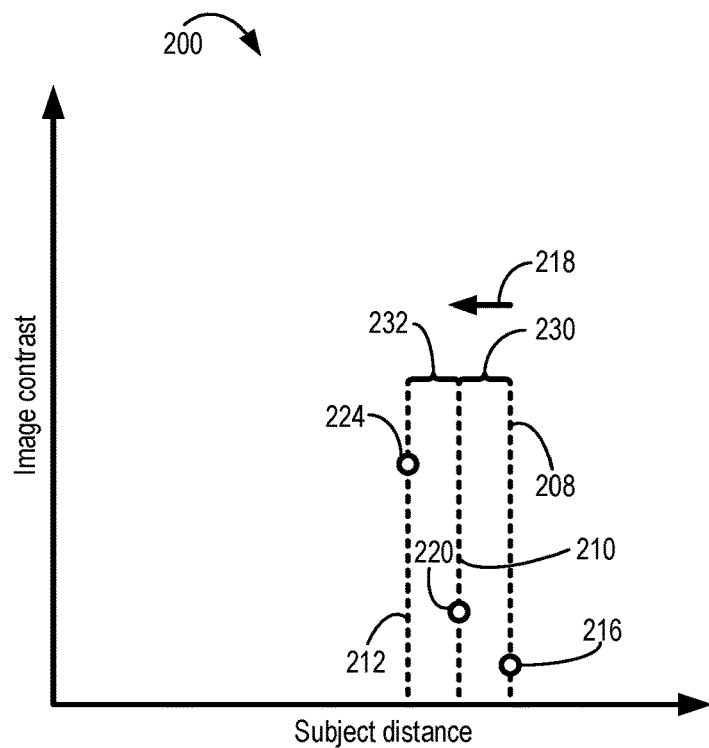
FIG. 2 shows a graph illustrating various image contrast samples acquired at fixed intervals for auto-focusing of a microscope.
Figure 3:
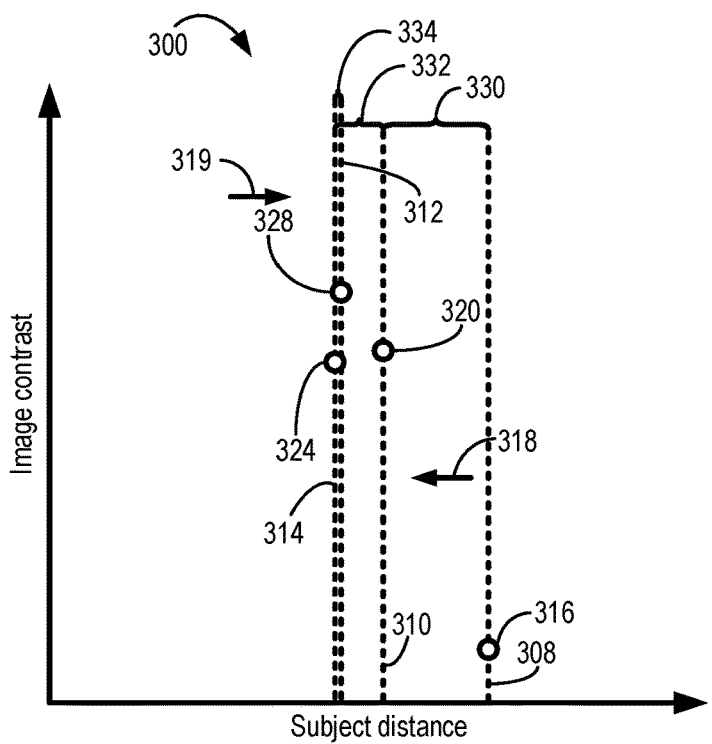
FIG. 3 shows a graph illustrating various image contrast samples acquired at incrementally smaller intervals for auto-focusing of a microscope.
Figure 4:
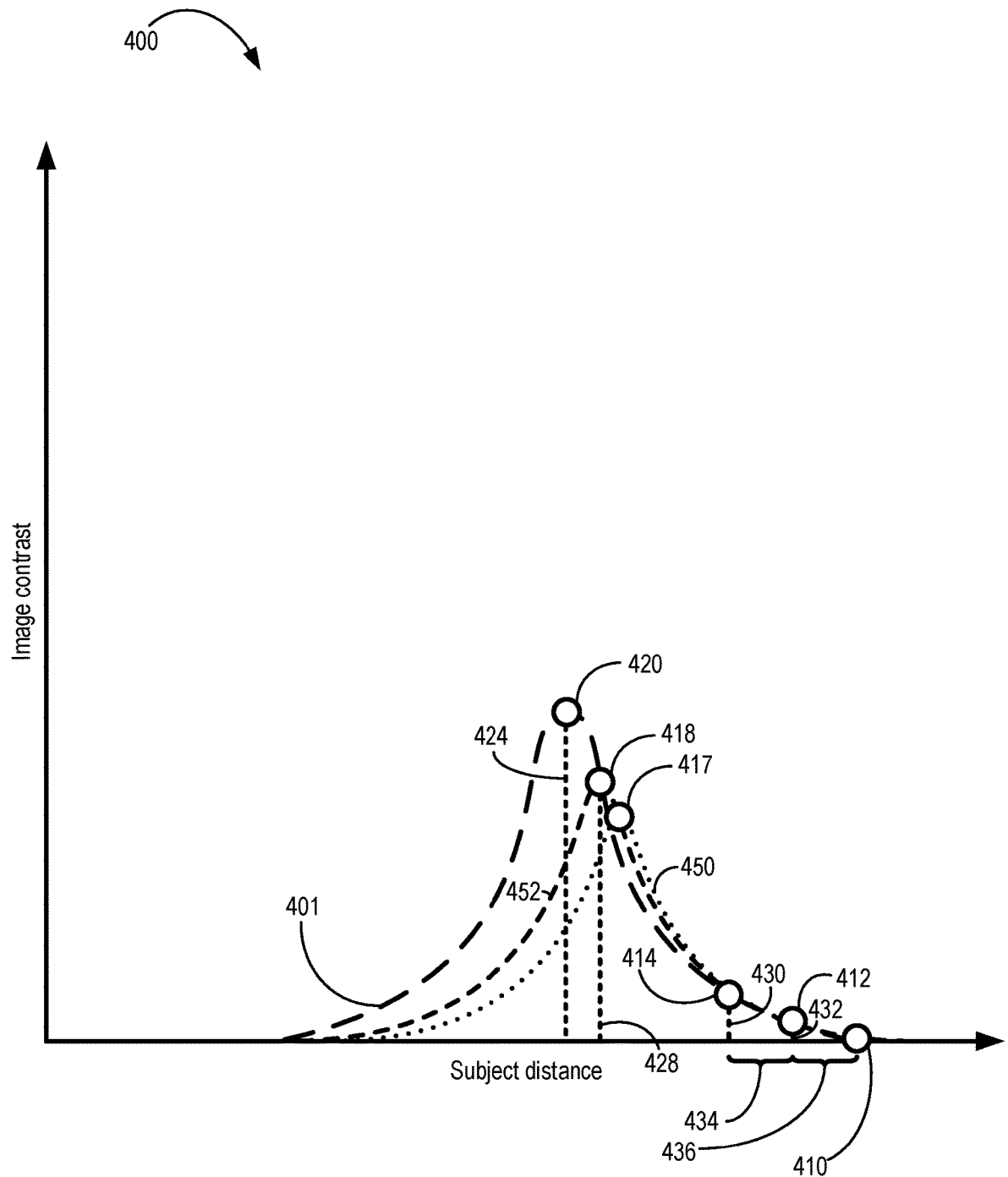
FIG. 4 shows a graph illustrating a first modeled contrast distribution for auto-focusing of a microscope.
Figure 5:
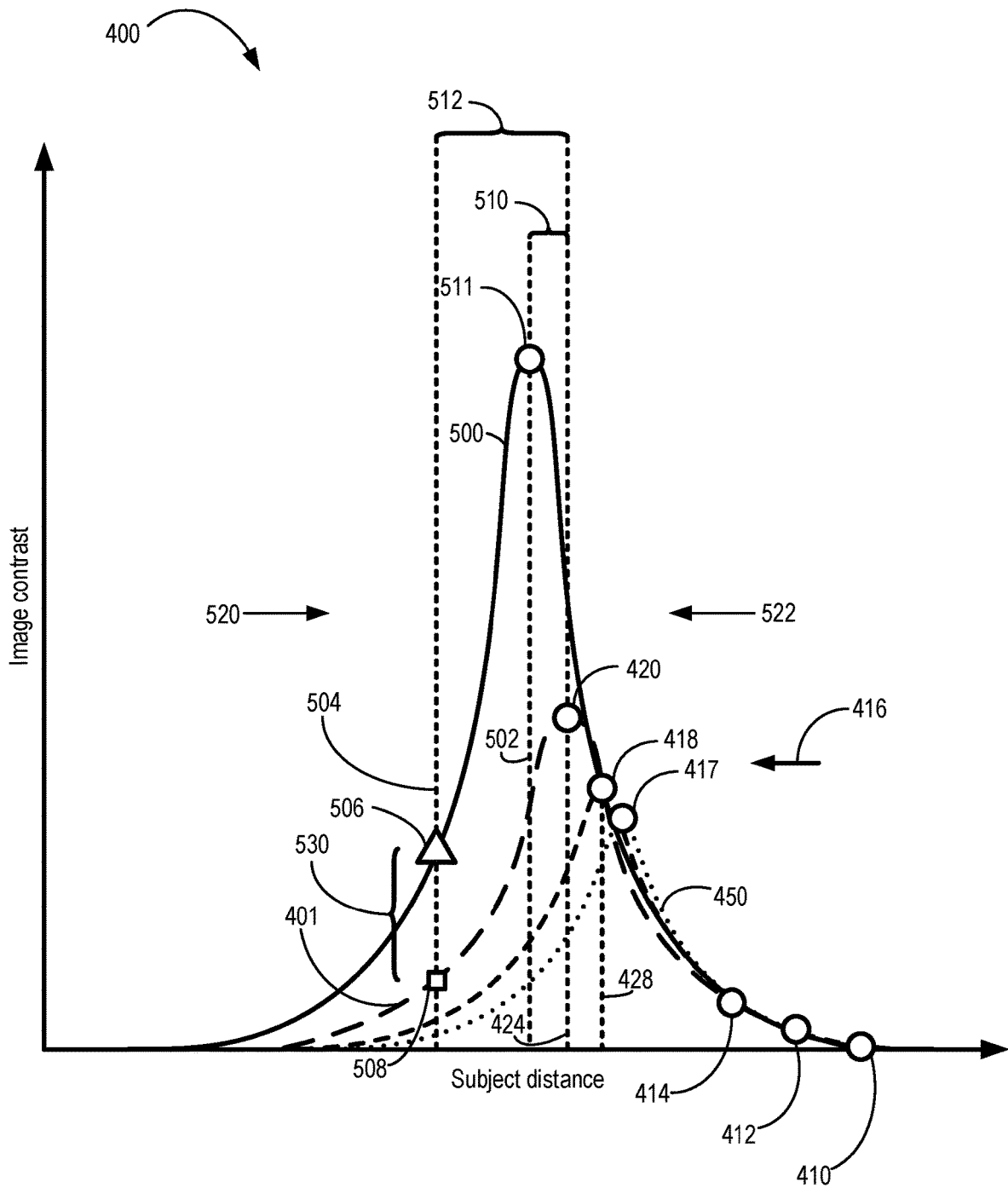
FIG. 5 shows a graph illustrating the first modeled contrast distribution and a corrected, second modeled contrast distribution for auto-focusing of a microscope.

The following description relates to systems and methods for high-speed image auto-focusing in microscopy. A microscope imaging system, such as the system shown schematically by FIG. 1, is configured for auto-focusing of an imaged subject, such as a tissue specimen of a patient. The imaged subject may be arranged at a stage of the system, and a distance between the imaged subject and an objective of the system may be adjusted to adjust the focusing of the imaged subject. Adjusting the distance between the imaged subject and the objective may increase or decrease a contrast of images sampled by the system, as shown by FIGS. 2-3, where increasing the focusing of the imaged subject increases the image contrast. According to the method shown by FIGS. 6A-6C and the configurations described herein, the system acquires three image contrast samples using different distances between the imaged subject and the objective. A first contrast distribution is modeled based on the acquired image contrast samples and an estimated focused position of the imaged subject relative to the objective is determined, as shown by FIG. 4. The system may determine whether the estimated focused position is acceptable for imaging of the subject based on the three image contrast samples. If the system determines that further adjustment of the distance between the imaged subject and the objective may increase image contrast, the system determines corrected positions based on the acquired image contrast samples. A probing image contrast sample may be acquired and compared with an expected range in order to determine whether the corrected positions are acceptable for imaging of the subject. If additional focusing may be performed, a second contrast distribution is modeled based on each acquired image contrast sample, including the probing image contrast sample, as shown by FIG. 5. The distance between the imaged subject and the objective may then be adjusted based on a peak of the second contrast distribution. In this way, the imaged subject may be more quickly focused, and imaging quality may be increased.

Referring to FIG. 1, a microscope assembly 100 is schematically shown. The microscope assembly 100 may be referred to herein as an assembly and/or microscope. The microscope assembly 100 includes an illumination system 107 comprising a light source 103 and optical elements for directing incident light to a subject 110 or specimen to be imaged. The microscope assembly 100 additionally includes an auto-focus system 101 for automatically aligning a focus of an objective 108 of the microscope with a target focal plane (e.g., focal plane 105) of a subject 110 to be imaged.

The microscope assembly 100 may be a bright-field imaging microscope assembly where illumination of the subject 110 is provided from below the subject 110. In the example shown, the microscope assembly 100 includes a condenser lens 132 configured to project illumination light from a light source 103 below the subject 110 onto the subject 110. The objective 108 is therefore arranged on an opposite side of the subject 110 from the condenser lens 132.

The auto-focus system 101 includes an auto-focus sensor 102 which may house a variety of optical components, some of which are depicted in FIG. 1 while some are omitted for brevity. For example, the auto-focus sensor 102 may include one or more lenses for collimating the light 160, a beamsplitter for splitting the light 160 into at least two beams, etc. It will be appreciated the auto-focus sensor 102 may include additional components not described herein.

In some examples, the microscope may be used for quantitative optical analysis, such as fluorescence microscopy, and optical train 106 may include various filters to control which wavelengths of light travel through the objective 108 of the microscope assembly 100. In other examples, the microscope may be configured to provide non-quantitative, optical images of a subject 110 and the various filters may not be implemented.

The optical train 106 may include a partially reflective mirror 112 (e.g., beamsplitter) configured to reflect a first portion of the light 160 toward the detector 114 of the auto-focus sensor 102 and to transmit a second portion of the light 160 through the mirror 112 toward eyepiece 140. In some embodiments, the eyepiece 140 may be an image sensor (e.g., a camera). In other embodiments, the optical train 106 may include camera 117 configured to receive light forming the image of the subject 110. Camera 117 may be electronically coupled to one or more electronic storage devices (e.g., hard drives, etc.) for storage of images acquired by the microscope assembly 100.

A same image may be formed by the first portion of the light 160 reflected toward the detector 114 relative to the second portion of the light 160 transmitted through the mirror 112 to eyepiece 140 (e.g., the light incident upon the detector 114 forms a same image as the light incident upon the eyepiece 140). Although the microscope assembly 100 includes the eyepiece 140 in the embodiment shown, it should be appreciated that in other embodiments the microscope assembly 100 may include an image sensor in electronic communication with controller 116 configured to receive the second portion of the light 160 transmitted through the mirror 112. The controller may receive signals from the image sensor and may transmit image data from the image sensor to a display device (e.g., a monitor, touchscreen, etc.) for viewing by an operator of the microscope assembly 100 (e.g., a technician). In some embodiments, the microscope assembly may include both of the image sensor and the eyepiece 140 such that the operator may view the image of the subject 110 through the eyepiece 140 and/or at the display device.

Although the configuration shown by FIG. 1 includes the auto-focus sensor 102 arranged off-axis relative to axis 150, in some embodiments the auto-focus sensor 102 may be arranged at a different location. For example, the auto-focus sensor 102 may be integrated with camera 117 and/or eyepiece 140, in some embodiments. As one example, camera 117 may be integrated with auto-focus sensor 115 as a single unit, where the auto-focus sensor 115 is similar to, or the same as, the auto-focus sensor 102 and includes a respective detector 119 in electronic communication with electronic controller 116. The detector 119 may be similar to, or the same as, the detector 114 of auto-focus sensor 102. In such embodiments, the detector 119 of the auto-focus sensor 115 may receive light via the camera 117 and/or eyepiece 140 and may transmit signals electronically to controller 116 indicating the intensity of the received light forming an image of the subject 110.

In the example shown, the objective 108 includes a first lens 136 and a second lens 138. The light 160 passing through the first lens 136 may be collimated by the first lens 136 prior to the light 160 being intercepted by the mirror 112. As described above, a portion of the collimated light may be reflected by the mirror 112 toward the detector 114. In other embodiments, however, the objective 108 may include a different configuration (e.g., a single lens) and/or the auto-focus sensor 102 may be in a different relative arrangement. In each embodiment, however, the auto-focus sensor 102 receives at least a portion of the light 160 and may transmit signals electronically to controller 116 indicating the intensity of the received light forming an image of the subject 110. The controller 116 may determine a contrast of the image of the subject 110 based on the signals transmitted to the controller 116 by the auto-focus sensor 102 and the controller 116 may adjust the focusing of the subject 110 based on the determined image contrast, as described further below. In one example, the detector 114 may be a charge coupled device (CCD) sensor configured to convert light into a digital signal.

The digital signal generated at the detector 114 may be sent to controller 116 that is electronically coupled to the detector 114 and to a positioning device 118 for adjusting a position of the objective 108 relative to the subject 110. For example, the device 118 may be a motor that translates the objective 108 along axis 150 of the optical train 106 of the microscope assembly 100 to adjust a distance 120 between the objective 108 and the subject 110. By adjusting the distance 120 between the objective 108 and the subject 110, the focusing of the subject 110 may be adjusted.

The controller 116 receives the digital signal from the detector 114 and evaluates an alignment of the microscope focus, and therefore the position of the objective 108, based on an image generated based on the digital signal. The controller 116 may use the image to guide adjustment of the objective position via the device 118 until the focus is determined to be aligned with the target focal plane or region, as described below. As such, the auto-focus sensor 102 provides continuous feedback for triangulating and re-positioning the objective 108 in response to changes in the subject 110. For example, the subject 110 may be shifted along a plane perpendicular to the axis 150 of the optical train 106 which may change a depth of the target focal plane or region. The auto-focus sensor 102 enables detection of the change and modification of the microscope focus in response to the change.

The controller 116 may be a computer, including various components such as a processor, input/output ports, an electronic storage medium for executable programs and calibration values, random access memory, a data bus, etc. The electronic storage medium can be programmed with computer readable data representing instructions executable by the processor for performing the methods described herein as well as other variants that are anticipated but not specifically listed. The controller 116 may be coupled to various accessory devices including input devices such as a keyboard, a mouse, etc.

The controller 116 may be communicatively coupled to various components of the microscope assembly 100. For example, the controller 116 may be configured to command activation/deactivation of light source 103 of the illumination system 107 when prompted based on user input or based on detection of a presence of the subject 110. In some examples, the light source 103 may be a light-emitting diode (LED) or array of diodes, and in some examples, the light 160 may be collimated by a lens before reaching the objective 108. As another example, the controller 116 may instruct adjustment of the position of the subject 110 to project the light 160 on a different region of the subject 110. For example, the controller 116 may command actuation of a motor 170 coupled to a stage 134 (e.g., a subject stage) to vary the position of the stage 134 with respect to the objective 108 along axis 150. In some examples, a position sensor, such as position sensor 172, may monitor the position of the stage 134 (and subject 110) and may be communicatively coupled to the controller 116 to relay the stage position (and subject position) to the controller 116.

The digital signal produced by the detector 114 may be processed by the controller 116 and displayed at an interface, such as a computer monitor. It will be appreciated that the controller 116 may be further coupled to other sensors and actuators of the microscope assembly 100. In one example, communication between the controller 116 and the sensors and actuators of the microscope may be enabled by various electronic cables, e.g., hardwiring. In other examples, the controller 116 may communicate with the sensors and actuators via a wireless protocol, such as Wifi, Bluetooth, Long Term Evolution (LTE), etc.

According to the routines and configurations described herein, the microscope assembly 100 is provided with auto-focusing at an increased speed and with an increased accuracy. The controller 116 performs image-based auto-focusing by controlling the position of the stage 134 based on a sampled image contrast determined by the controller for various positions of the stage 134 and the subject 110 relative to the objective 108. The controller 116 adjusts the position of the stage 134 and subject 110 to increase the image contrast with increased accuracy and a reduced amount of time even in the presence of vibration of the microscope assembly 100 and/or other factors that may reduce a signal-to-noise ratio of images acquired by the microscope assembly 100.

As the microscope assembly 100 performs auto-focusing of the subject 110, the content (e.g., contrast) of images acquired (e.g., sampled) by the microscope assembly 100 may be evaluated (e.g., measured) by the controller 116 according to a merit function such as the Brenner gradient. The controller 116 may determine the contrast of a sampled image by calculating the image contrast via the Brenner gradient to guide the auto-focusing process. The controller 116 may make predictions (e.g., estimations) as to adjustments to the position of the stage 134 and subject 110 that may increase focusing of the subject 110 (e.g., increase an imaging contrast of the subject 110) by modeling one or more contrast distributions according to the methods described herein. As one example, a contrast distribution may be modeled by the controller 116 based on the Lorentzian function, where an estimated peak focused position (e.g., a position associated with a highest imaging contrast) of the subject 110 corresponds to a peak of the modeled contrast distribution (e.g., a peak of a Lorentzian curve). As a result of noise in the acquired images, unknown parameters in the imaging mode, and an unknown difference between the initial position of the auto-focusing process and the position corresponding to the highest image contrast, the controller 116 may model additional contrast distributions and/or acquire additional image contrast samples to steer the auto-focusing process according to the method described herein and illustrated by FIGS. 6A-6C (described further below).

Referring to FIG. 2, a graph 200 is shown illustrating different image contrast samples acquired by a controller of a microscope assembly (e.g., controller 116 of microscope assembly 100 described above). In the example shown by FIG. 2, the image contrast samples are acquired sequentially by the controller by adjusting a distance between a stage of the microscope assembly (e.g., stage 134 shown by FIG. 1 and described above) and an objective of the microscope assembly (e.g., objective 108 described above with reference to FIG. 1). The distance 120 shown by FIG. 1 may be an example of the distance between the stage and the objective adjusted by the controller with reference to FIG. 2. In some embodiments, the controller may adjust the position of the stage (e.g., move the stage) relative to the objective while maintaining the position of the objective to control the distance (e.g., spacing) between the stage and the objective. In other embodiments, the controller may adjust the position of the objective (e.g., move the objective) relative to the stage while maintaining the position of the stage to control the distance between the stage and the objective. By controlling the spacing between the stage and the objective, the controller also controls the distance between the objective and a subject supported by the stage (e.g., a specimen, or subject, to be imaged by the microscope assembly). For example, by increasing the distance between the stage and the objective by a first amount (e.g., 1 millimeter, 2 millimeters, etc.), the controller also increases the distance between the subject and the objective by the first amount.

Adjusting the distance (e.g., spacing) between the stage and the objective may adjust a focusing of the subject as viewed at an eyepiece of the microscope assembly (e.g., eyepiece 140 shown by FIG. 1 and described above) and/or a display device in electronic communication with the controller of the microscope assembly. As the focusing of the subject increases, the contrast of the image of the subject increases (e.g., the image at the eyepiece and/or image sensor in electronic communication with the controller and display device), and as the focusing of the subject decreases, the contrast of the image of the subject decreases. As a result, by adjusting the distance between the stage and the objective, the controller adjusts the distance between the objective and the subject which may increase or decrease the contrast of the image of the subject.

There may be a particular distance between the objective and the subject that results in a peak (e.g., maximized) focusing of the subject (e.g., a peak contrast of the image of the subject). The position of the subject relative to the objective that results in the peak focusing of the subject may be referred to herein as the focused position of the subject. The position of the subject as described herein refers to the spacing between the subject and the objective, such that adjusting the position of the subject refers to adjusting the distance between the subject and the objective (e.g., increasing or decreasing the distance between the subject and the objective). Prior to performing the auto-focusing methods described herein, the focused position of the subject may be unknown. However, by auto-focusing as described herein, the controller adjusts the position of the subject toward the focused position. During some conditions, increasing the distance between the subject and the objective may increase the focusing of the subject, and during other conditions, increasing the distance between the subject and the objective may decrease the focusing of the subject. Similarly, during some conditions, decreasing the distance between the subject and the objective may increase the focusing of the subject, and during other conditions, decreasing the distance between the subject and the objective may decrease the focusing of the subject. The controller may determine whether to increase or decrease the distance between the subject and the objective to move the subject toward the focused position according to the methods described herein.

In the graph 200 shown by FIG. 2, a first marker 216 indicates a first contrast sample acquired by the microscope assembly, a second marker 220 indicates a second contrast sample acquired by the microscope assembly, and a third marker 224 indicates a third contrast sample acquired by the microscope assembly. The first contrast sample, second contrast sample, and third contrast sample may be acquired sequentially (e.g., the microscope assembly may first acquire the first contrast sample indicated by first marker 216, then the second contrast sample indicated by second marker 220, then the third contrast sample indicated by third marker 224). For example, the microscope assembly may acquire the first contrast sample indicated by first marker 216 with the subject in an initial position, and the controller may adjust the position of the subject relative to the objective by a first amount 230 (e.g., a first amount of distance, between vertical axis 208 aligned with first marker 216 and vertical axis 210 aligned with second marker 220) by adjusting the position of the stage supporting the subject by the first amount 230. In the example shown by FIG. 2, the positive direction of the horizontal axis (e.g., the direction toward the right side of the horizontal axis) indicates increased distance between the subject and the objective, and the opposite direction of the horizontal axis (e.g., the direction toward the left side of the horizontal axis) indicates decreased distance between the subject and the objective. The positive direction of the vertical axis (e.g., the upward direction away from the horizontal axis) indicates increased image contrast, and the opposite direction of the vertical axis (e.g., the downward direction toward the horizontal axis) indicates decreased image contrast. The image contrast indicated by the vertical axis may be the Brenner gradient value.

After acquiring the first contrast sample indicated by the first marker 216, the controller adjusts the position of the stage supporting the subject by the first amount 230 which includes decreasing the distance between the subject and the objective by the first amount 230 (e.g., as indicated by the second marker 220 being offset from the first marker 216 in the direction 218). The controller then acquires the second contrast sample indicated by marker 220 and may determine a difference between the contrast (e.g., contrast value) of the first contrast sample and the contrast of the second contrast sample. In the example shown, because the contrast of the second contrast sample is higher than the contrast of the first contrast sample, the controller determines that adjusting the position of the subject to decrease the distance between the subject and the objective increases the image contrast. As a result, the controller continues to decrease the distance between the subject and the objective by adjusting the position of the stage by amount 232 (between vertical axis 210 aligned with second marker 220 and vertical axis 212 aligned with third marker 224). In the example shown, the amount 230 and the amount 232 are equal, and each adjustment decreases the distance between the subject and the objective as indicated by direction 218. The controller then acquires the third contrast sample indicated by third marker 224.

Although the third contrast sample has a higher contrast than the second contrast sample and the second contrast sample has a higher contrast than the first contrast sample, if the controller repeatedly adjusts the position of the subject by decreasing the distance between the subject and the objective by intervals equal to the amount 232 (or the amount 230, as the amount 230 and the amount 232 are equal and in the same direction 218), the distance between the subject and the objective may eventually decrease past the peak focused position of the subject (as the peak focused position is unknown to the controller). For example, the peak focused position of the subject may be between the position of the subject indicated by third marker 224 and a position offset from the third marker 224 in the direction 218 by amount 232 (or amount 230). Without varying the amount by which the controller adjusts the position of the subject prior to acquisition of each image, it may be difficult to determine the peak focused position of the subject. During conditions in which the peak focused position is relatively far from the initial position (e.g., conditions in which a distance between the peak focused position and the initial position is ten times the amount 230), adjusting the position of the stage and the subject iteratively by the amount 230 may increase the focusing time of the microscope assembly. Further, during conditions in which the peak focused position is relatively close to the initial position (e.g., conditions in which the distance between the peak focused position and the initial position is less than the amount 230), adjusting the position of the subject by the amount 230 may result in a higher amount of uncertainty in determining the location of the peak focused position as the adjustments by the amount 230 may be too large.

One approach to reducing the auto-focusing time and decreasing uncertainty in determining the location of the peak focused position may include varying the amount of adjustment of the position of the stage and subject, as illustrated by FIG. 3. In particular, FIG. 3 shows a graph 300 illustrating different image contrast samples acquired by a controller of a microscope assembly (e.g., similar to, or the same as, the controller 116 of microscope assembly 100 described above, or the controller described above with reference to FIG. 2). The image contrast samples are acquired by the controller by adjusting a distance between a stage of the microscope assembly (e.g., stage 134 shown by FIG. 1 and described above) and an objective of the microscope assembly (e.g., objective 108 described above with reference to FIG. 1), similar to the example shown by FIG. 2 and described above. However, in the example shown by FIG. 3, the distance between the subject and the objective is adjusted by a variable amount between sequential contrast samples, whereas in the example shown by FIG. 2 the distance is adjusted by a fixed amount (e.g., amount 230).

In the example shown, a first marker 316 indicates a first contrast sample acquired by the microscope assembly, a second marker 320 indicates a second contrast sample acquired by the microscope assembly, a third marker 324 indicates a third contrast sample acquired by the microscope assembly, and a fourth marker 328 indicates a fourth contrast sample acquired by the microscope assembly. The first contrast sample, second contrast sample, the third contrast sample, and the fourth contrast sample may be acquired sequentially (e.g., the microscope assembly may first acquire the first contrast sample indicated by first marker 316, then the second contrast sample indicated by second marker 320, then the third contrast sample indicated by third marker 324, and then the fourth contrast sample indicated by the fourth marker 328).

For example, the microscope assembly may acquire the first contrast sample indicated by first marker 316 with the subject in an initial position, and the controller may adjust the position of the subject relative to the objective by a first amount 330 (e.g., a first amount of distance, between vertical axis 308 aligned with first marker 316 and vertical axis 310 aligned with second marker 320) by adjusting the position of the stage supporting the subject by the first amount 330. In the example shown by FIG. 3, the positive direction of the horizontal axis (e.g., the direction toward the right side of the horizontal axis) indicates increased distance between the subject and the objective, and the opposite direction of the horizontal axis (e.g., the direction toward the left side of the horizontal axis) indicates decreased distance between the subject and the objective. The positive direction of the vertical axis (e.g., the upward direction away from the horizontal axis) indicates increased image contrast, and the opposite direction of the vertical axis (e.g., the downward direction toward the horizontal axis) indicates decreased image contrast. The image contrast indicated by the vertical axis may refer to the Brenner gradient value.

After acquiring the first contrast sample indicated by the first marker 316, the controller adjusts the position of the stage supporting the subject by the first amount 330 which includes decreasing the distance between the subject and the objective by the first amount 330 (e.g., as indicated by the second marker 320 being offset from the first marker 316 in the direction 318). The controller then acquires the second contrast sample indicated by second marker 320 and may determine a difference between the contrast (e.g., contrast value) of the first contrast sample and the contrast of the second contrast sample. In the example shown, because the contrast of the second contrast sample is higher than the contrast of the first contrast sample, the controller determines that adjusting the position of the subject to decrease the distance between the subject and the objective increases the image contrast. As a result, the controller continues to decrease the distance between the subject and the objective by adjusting the position of the stage by amount 332 (between vertical axis 310 aligned with second marker 320 and vertical axis 314 aligned with third marker 324). In the example shown, the amount 330 and the amount 332 are different. The controller may determine the amount 332 based on the amount 330, the contrast value of the first contrast sample, the contrast value of the second contrast sample, and the difference between the contrast of the first contrast sample and the contrast of the second contrast sample.

As one example, during conditions in which the difference between the contrast of the first contrast sample and the contrast of the second contrast sample is higher, the contrast value of the first contrast sample is relatively low, and the contrast value of the second contrast sample is relatively high, the amount 332 may be lower than (e.g., less than) the amount 330 in order to reduce a likelihood of adjusting the focusing of the subject beyond a peak focused position (where the peak focused position is unknown to the controller). During conditions in which the difference between the contrast of the first contrast sample and the contrast of the second contrast sample is lower, the contrast value of the first contrast sample is relatively low, and the contrast value of the second contrast sample is relatively low but higher than the contrast value of the first contrast sample, the amount 332 may be higher than (e.g., greater than) the first amount 330 in order to increase a likelihood of moving toward the peak focused position with a fewer number of adjustments. Other examples are possible.

In the example shown, the controller acquires the first contrast sample, adjusts the distance between the subject and the objective by the amount 330, and acquires the second contrast sample. Because the contrast value of the second contrast sample is higher than the contrast value of the first contrast sample, the controller determines that additional decreasing of the distance between the subject and the objective may move the subject closer to the peak focused position. As a result, the controller adjusts the distance by amount 332 to further decrease the distance between the objective and the subject, where the amount 332 is different than the amount 330 (e.g., less than the amount 330). The third contrast sample indicated by third marker 324 is then acquired. The controller determines the contrast value of the third contrast sample and compares the contrast value of the third contrast sample to the contrast value of the second contrast sample. Because the contrast value of the third contrast sample is lower than the contrast value of the second contrast sample, the controller determines that additional decreasing of the distance between the subject and the objective may move the subject away from the peak focused position. As a result, the controller adjusts the distance by amount 334 (between vertical axis 314 aligned with third marker 324 and vertical axis 312 aligned with fourth marker 328), where the adjustment moves the subject further from the objective (e.g., as indicated by direction 319). The amount 334 is less than the amount 332.

Figure 6A:
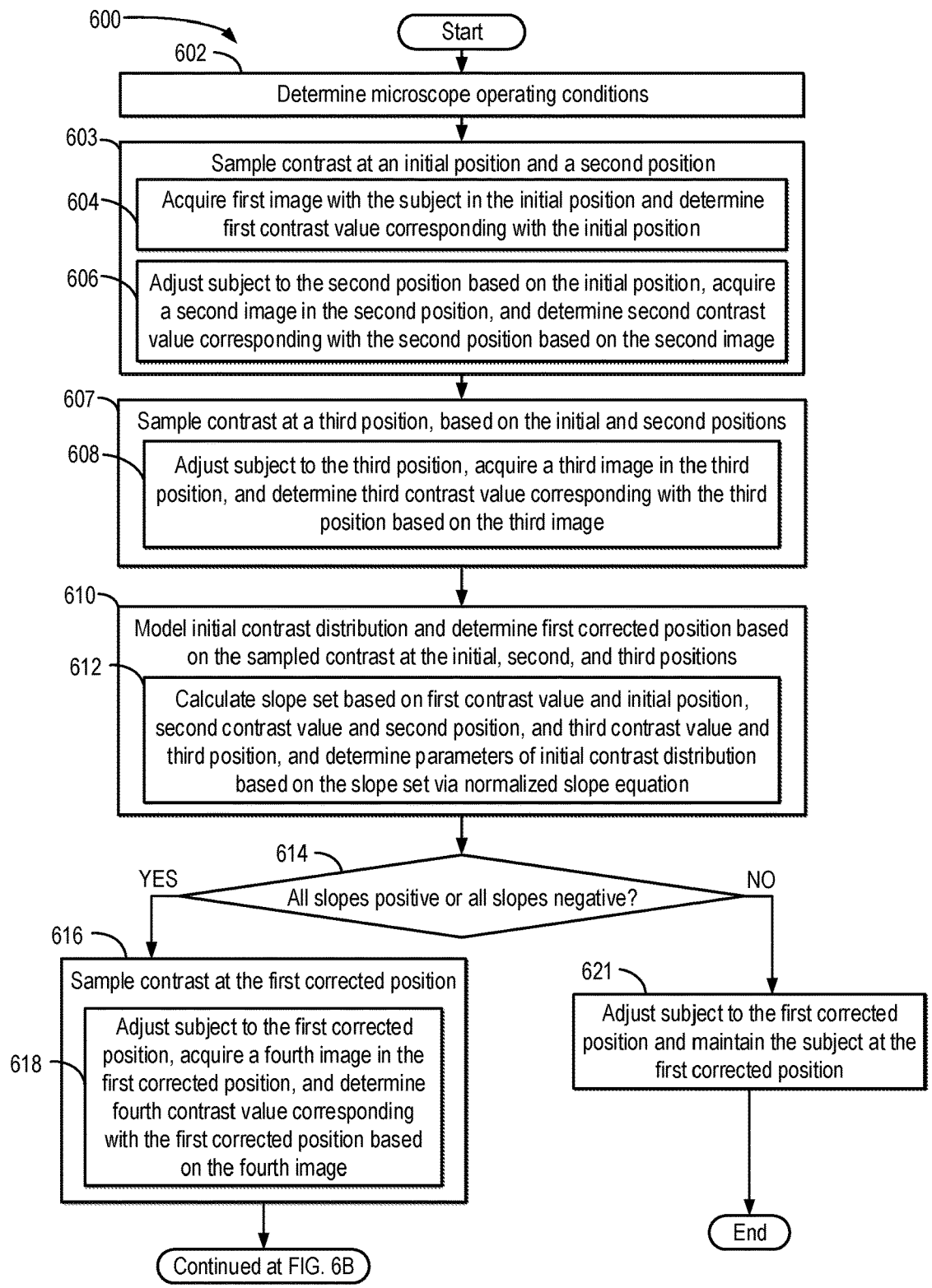
FIGS. 6A-6C show a flowchart illustrating a method for auto-focusing a microscope.
Figure 6B:
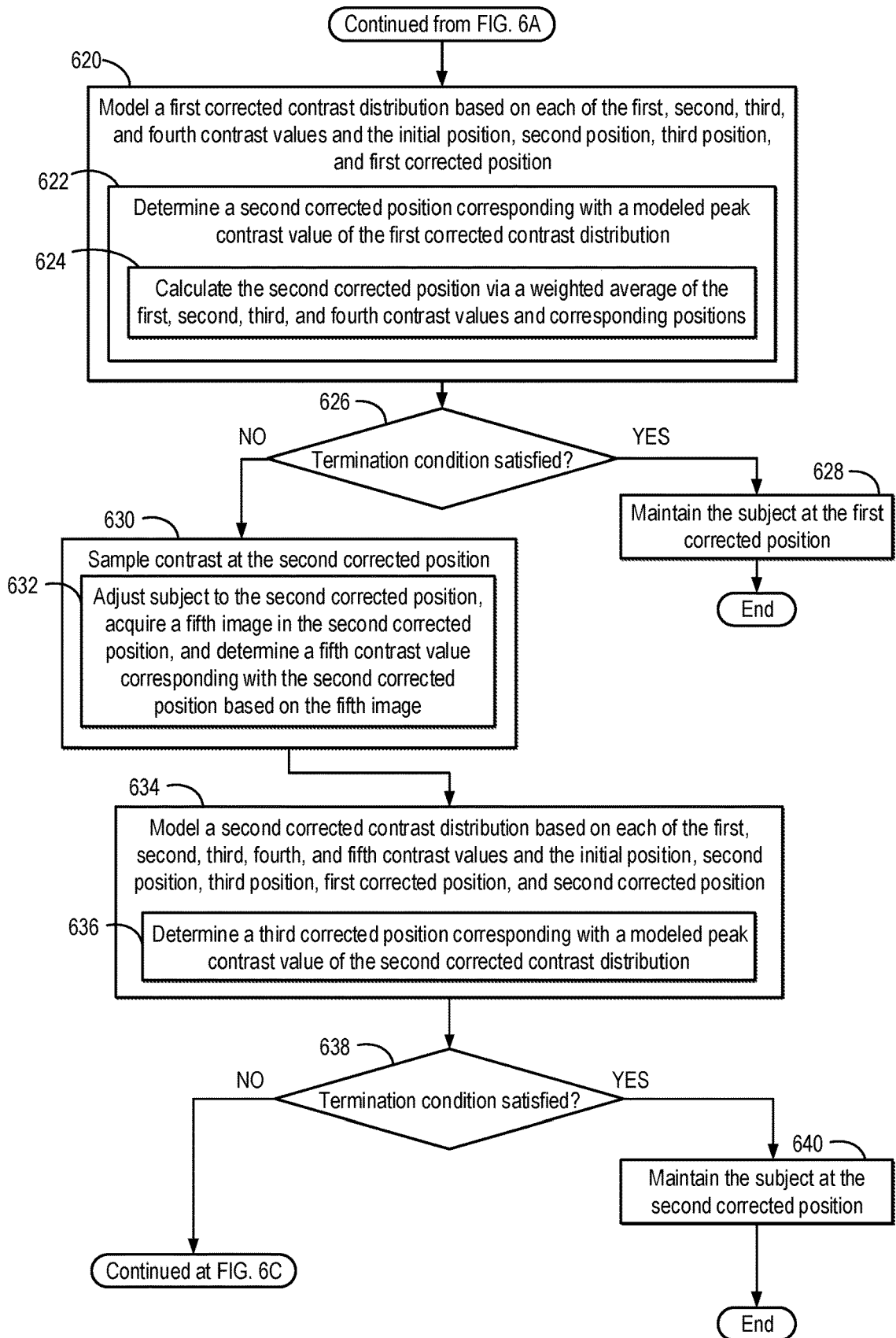
Figure 6C:
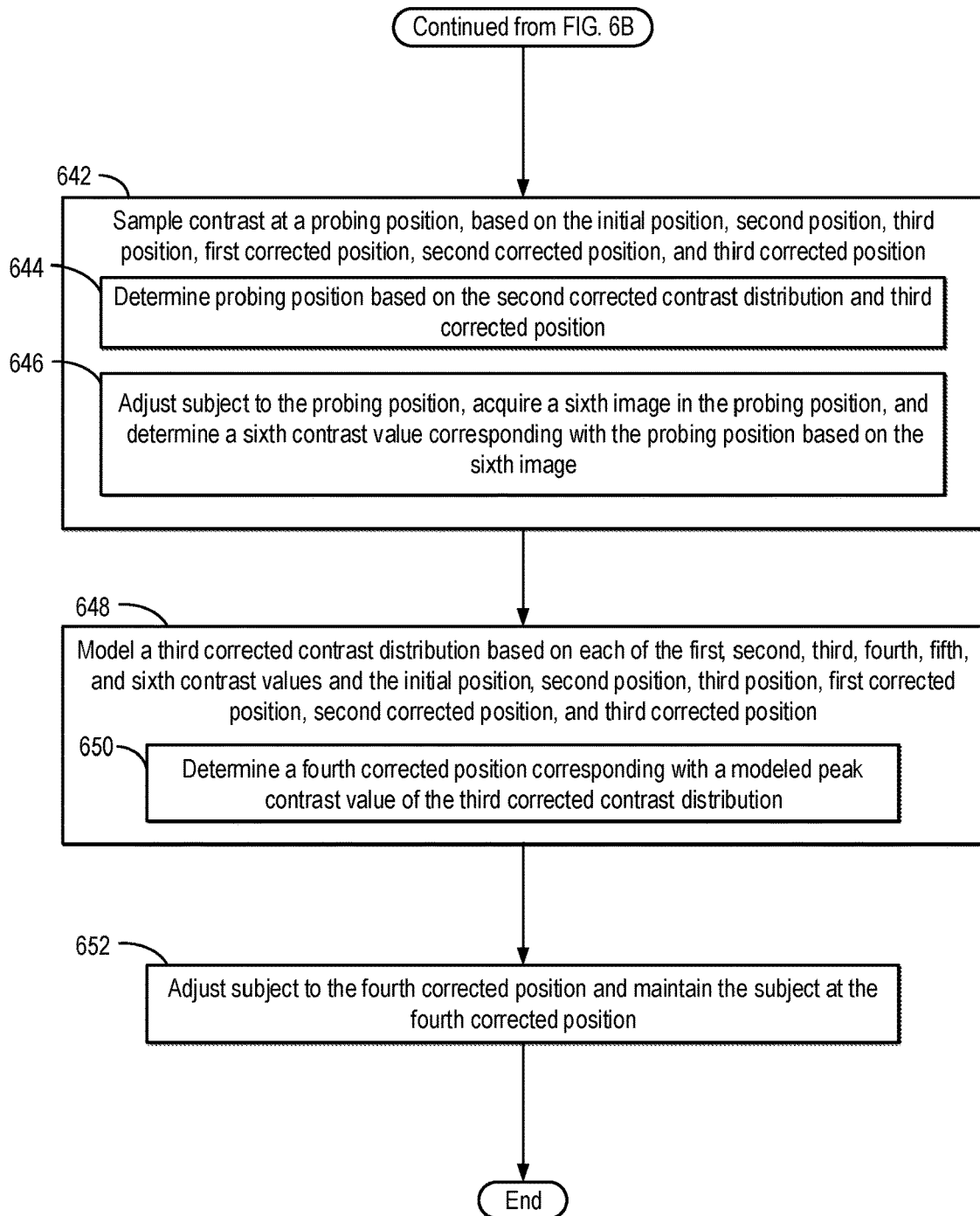

By continuing to adjust the distance between the subject and the objective by progressively smaller amounts, the controller may move the subject toward the peak focused position. However, the number of adjustments to move the subject to the peak focused position by progressively decreasing the amount of the adjustment to the position of the subject may be relatively high which may increase a time (e.g., duration) of the auto-focusing of the subject. Progressively decreasing the amount by which the position of the subject is adjusted may result in a likelihood that the subject does not reach the peak focused position (e.g., due to adjustments becoming too small). Further, by adjusting the position of the subject by a fixed amount (e.g., as shown by FIG. 2 and described above) or by adjusting the position of the subject by progressively smaller amounts (e.g., as shown by FIG. 3 and described above), there is a potential for the controller to undesirably adjust the subject toward a false peak focused position. However, according to the methods described herein (e.g., the method described below with reference to FIGS. 6A-6C), the controller makes a determination as to whether a false peak focused position has been detected and corrects the auto-focusing of the subject accordingly to move the subject toward the true peak focused position. In this way, the amount of adjustments to the position of the subject to move the subject to the peak focused position may be reduced, which may result in lower auto-focusing times and increased efficiency. An example of contrast distribution modeling performed by the controller during the method described below with reference to FIGS. 6A-6C is shown by FIGS. 4-5 and described below.

Referring to FIG. 4, another graph 400 is shown illustrating different image contrast samples acquired by a controller of a microscope assembly (e.g., similar to, or the same as, the controller 116 of microscope assembly 100 described above, or the controller described above with reference to FIG. 2). The image contrast samples are acquired by the controller by adjusting a distance between a stage of the microscope assembly (e.g., stage 134 shown by FIG. 1 and described above) and an objective of the microscope assembly (e.g., objective 108 described above with reference to FIG. 1), as described above. In the example shown by FIG. 4, the distance between the subject and the objective is adjusted by the controller based on one or more contrast distributions generated by the controller, as described below.

The controller may measure the contrast of images acquired by the microscope assembly using the Brenner gradient. Although the Brenner gradient may be used to evaluate the image contrast, it is a "relative measurement", which means the highest value corresponding to the in-focus image (e.g., the peak focused position of the subject) can be identified with several data points (e.g., contrast samples) to form the actual Lorentzian curve by acquiring several images for different positions of the subject (e.g., different distances between the subject and the objective). During conditions in which the acquired contrast samples are relatively evenly distributed around and close to the actual peak focused position and when the data fidelity is high (e.g., a signal-to-noise ratio of the acquired contrast samples is relatively high), the controller may estimate the peak focused position based on a relatively small number of contrast samples (e.g., as few as three contrast samples) via a curve fitting routine (e.g., a modeling of the Lorentzian curve). However, during conditions in which the signal-to-noise ratio of acquired contrast samples is relatively low and/or during conditions in which the position of the subject during acquisition of the contrast samples is far from the actual peak focused position of the subject, the controller may determine that additional contrast samples are desirable to increase the accuracy of the estimation of the peak focused position.

In some configurations, due to noise in the image data, attempts to identify the peak focused position of the subject may result in a false in-focus position. For example, excessive noise in contrast samples acquired by the controller may result in an estimated focused position that does not correspond with the actual peak focused position. However, according to the methods and configurations described herein, false in-focus positions may be eliminated.

Contemporary digital microscopy often demands high-resolution details and wide-area or high-throughput imaging capability at the same time for the whole-slide imaging system or high-content analysis. Auto-focusing is often the bottleneck in the speed aspect. The fast and accurate auto-focusing routines described herein unlock the full potential of the high-performance microscopy system equipped with high-speed imaging and data communication devices.

Auto-focusing can be performed based on indirect or direct measurement. Indirect approaches measure physical quantities other than the image quality itself and may use specific hardware implementations, such as a high-precision motorized stage position encoder, optical triangulation, imaging laser beam convergence, multi-angle correspondence, or low-coherence interferometry. However, the methods described herein use direct measurement via acquired image content (e.g., the contrast or high frequency component) to guide the focusing process. The methods of the present disclosure use the Brenner gradient to measure the contrast in acquired images. The Brenner gradient may be calculated using pixel intensities of acquired images and the equation $$B_z = \frac{\sum_{x,y}(I(x, y+2) - I(x, y))^2}{\sum_{x,y} I(x, y)^2},$$

where I is the image intensity at pixel (x, y) acquired at a subject distance of Z (where the subject distance is a distance between the subject and the objective).

The value of $B_z$ at various subject distances, Z, around the in-focus position, where $Z=Z_0$, will have a distribution that can be described by the Lorentzian function:

$$L(z) = \frac{A}{1 + \left(\frac{z - z_0}{H}\right)^2},$$

where A is the peak amplitude and H is the half-width at half-maximum (HWHM).

If the subject is not at the actual peak focused position, where $Z \neq Z_0$, the calculated Brenner gradient will be located on the corresponding Lorentzian curve sitting at an off-peak position. A goal of the auto-focusing process is to move the subject toward the peak focused position, where the peak focused position is represented by the peak of the Lorentzian curve.

One way to reach the in-focus direction is to change the subject distance at a fixed interval toward the favorable direction, where the Brenner gradient is increasing as it is shown in FIG. 2 and described above. However, such an approach may reduce a resolution on Z in favor of the speed of auto-focusing (or vice versa). Binary searching toward the peak with constant decreasing step size is another strategy. The step size is decreased at every step to improve the focus accuracy, and the sign of the Brenner gradient change is used to steer the moving direction, as it is shown in FIG. 3 and described above. However, in such approaches, the efficiency is not optimized for various starting conditions with a fixed initial step size, and there may be a hard limit on the range of auto-focusing due to its decreasing step nature as described above.

Since the distribution of the Brenner gradient at various subject distances is a Lorentzian function, it is reasonable to use a curve fitting routine based on a few data points to estimate the peak and hence the in-focus position. Although the Lorentzian curve fitting routine may be used with as few as three contrast samples to determine the peak focused position during conditions in which the signal-to-noise ratio of the contrast samples is very high, the initial position of the subject is close to the actual peak focused position, and an estimated half-width half-maximum of the Lorentzian curve is approximately equal to the actual value, during conditions in which the initial position of the subject is not close to the actual peak focused position, the Brenner gradient becomes smaller and its signal-to-noise (SNR) ratio decreases rapidly. Curve fitting during conditions in which the initial position of the subject is not close to the actual peak focused position may therefore have less accuracy and the iterative process of acquiring contrast samples may result in an oscillating behavior of adjustment of the position of the subject, which may result in a false determination of the peak focused position.

Some curve fitting routines such as those based on the Levenberg-Marquardt algorithm utilize initial guesses to model an initial curve, such as guesses as to the amplitude, peak location, and the half-width half-maximum of the curve. Reliable curve fitting using such methods depends on the quality of the initial guesses, which can be non-trivial and may use further analysis based on the existing data, which may increase a duration of the auto-focusing. The unknown parameters may eventually be determined via acquisition of a relatively large number of data points (e.g., ten data points, fifteen data points, etc.). With fewer than six data points, the unknown amplitude and unknown peak location of the curve may be guessed, but the accuracy of such guesses may be lower than desired.

The disclosed auto-focusing system and methods addresses the above-described issues by applying an additional layer of intelligence onto the curve fitting routine to find the peak focused position iteratively. In an embodiment, a method for auto-focusing may be referred to herein as a "supervising algorithm" and uses a multi-staged strategy to guide the curve fitting process and determine the peak focused position at least in part by comparing measured image contrast to a termination criteria. As one example, the termination criteria or termination condition may be a condition in which a subject position associated with a peak of a modeled curve (e.g., contrast distribution) generated by the microscope assembly is within a threshold range of an actual peak focused position of the subject (e.g., conditions in which the peak of the modeled curve is within the depth of the field or the smallest achievable mechanical adjustment amount away from the actual peak focused position). The threshold range may be based on a resolution of mechanical movement of the motorized stage of the microscope assembly (e.g., in configurations in which the stage of the microscope assembly may be adjusted by a minimum amount of 0.25 micrometers, the threshold range may be 0.3 micrometers). The method includes determining the initial position, then using the centroid concept to determine initial estimates toward the actual curve. The method then includes intentionally moving away from the estimated peak position in order to break out possible local optimization trapping. The method then includes solving for all unknowns including the half-width half-maximum to increase the accuracy of the determined peak focused position. Finally, the method includes determining whether a termination condition has been met, where the termination condition checks the fitting error and the convergence of the peak focused position to stop the auto-focusing process.

FIGS. 4-5 illustrate image contrast samples acquired by the controller during an auto-focusing routine. In an embodiment, the auto-focusing routine is the same as the method described below with reference to FIGS. 6A-6C and/or the method described above. In the example shown, the controller acquires a first contrast sample (indicated by first marker 410), a second contrast sample (indicated by second marker 412 aligned with vertical axis 432), and a third contrast sample (indicated by third marker 414 aligned with vertical axis 430) sequentially (e.g., the first contrast sample may be acquired, then the second contrast sample may be acquired, then the third contrast sample may be acquired). The position of the subject relative to the objective is indicated by the horizontal positions of the markers in the graph 400. The horizontal position of the marker 410 indicates a position of the subject relative to the objective that may be referred to herein as an initial position of the subject, the horizontal position of the marker 412 indicates a position of the subject relative to the objective that may be referred to herein as a second position of the subject, and the horizontal position of the marker 414 indicates a position of the subject relative to the objective that may be referred to herein as a third position of the subject.

The distance between the subject and the objective may be adjusted prior to acquisition of the third contrast sample based on a difference between the first contrast sample and the second contrast sample. In the example shown, the second contrast sample has a higher contrast value as compared to the contrast value of the first contrast sample, where the adjustment of the distance between the subject and the objective is decreased following acquisition of the first contrast sample and prior to acquisition of the second contrast sample (e.g., as indicated by the second marker 412 being to the left of the first marker 410, in the direction 416). As a result, the controller determines that the distance between the subject and the objective should be further decreased (e.g., decreased again) prior to acquisition of the third contrast sample in order to move the subject closer to the peak focused position (with the peak focused position being unknown to the controller prior to acquisition of the third contrast sample). Although the distance between the subject and the objective is decreased by a first amount 436 following acquisition of the first contrast sample and prior to acquisition of the second contrast sample, the distance is decreased by a second amount 434 following acquisition of the second contrast sample and prior to acquisition of the third contrast sample, and the first amount 436 is equal to the second amount 434 in the example shown, it should be appreciated that in other examples the first amount and the second amount may not be equal. In some examples, the first amount 436 and/or the second amount 434 may be between 2-4 micrometers (which may be within a range of half-width half-maximums associated with Lorentzian curves modeled by the controller for bright-field microscopy).

Acquiring a contrast sample, as described herein, refers to acquiring an image of the subject with the subject positioned relative to the objective and calculating the contrast value of the acquired image. The calculation of the contrast value may be similar to the examples described above with reference to FIGS. 1-2 (e.g., the contrast value may be the Brenner gradient of the image).

The controller determines the contrast value of the third contrast sample indicated by third marker 414 and compares the contrast value of the third contrast sample to the contrast value of the second contrast sample. In the example shown, the contrast value of the third contrast sample is higher (e.g., larger) than the contrast value of the second contrast sample. Based on the difference between the contrast value of the third contrast sample and the contrast value of the second contrast sample, the controller determines that further decreasing the distance between the subject and the objective may move the subject toward the peak focused position. However, in an example in which the controller determines that the contrast value of the third contrast sample is less than (e.g., lower than) the contrast value of the second contrast sample, the controller may determine that the peak focused position is somewhere between the position of the subject during acquisition of the second contrast sample and the position of the subject during acquisition of the third contrast sample. The controller may then model a first contrast distribution based on the first contrast sample, the second contrast sample, and the third contrast sample to determine the peak focused position. However, during conditions in which the controller determines that the peak focused position is not between any of the positions of the subject associated with the first contrast sample, the second contrast sample, and the third contrast sample (e.g., as shown by FIG. 4), the controller may proceed as described below. In particular, during conditions in which the controller determines that the peak focused position is not between the position of the subject during acquisition of the first contrast sample and the position of the subject during acquisition of the third contrast sample, the controller may proceed as described below.

The controller may model the first contrast distribution indicated by plot 450 (which may be referred to herein as an initial contrast distribution) to estimate the peak focused position. The peak position of the initial contrast distribution is indicated by marker 417, and the position of the subject relative to the objective indicated by the horizontal position of the marker 417 may be referred to herein as a first corrected position. The vertical position of the marker 417 indicates a contrast value that may be referred to herein as a fourth contrast value (where the vertical position of the marker 410 indicates a contrast value that may be referred to herein as a first contrast value, the vertical position of the marker 412 indicates a contrast value that may be referred to herein as a second contrast value, and the vertical position of the marker 414 indicates a contrast value that may be referred to herein as a third contrast value).

If the contrast samples were to have no noise and the controller were able to determine an initial position of the subject for acquisition of the first contrast sample that strongly approximates the actual peak focused position, the controller may be able to determine the actual peak focused position from the first contrast distribution. However, because contrast samples often have some noise and because the initial position is often not approximately equal to the actual peak focused position (e.g., especially if the initial position is more than 10 micrometers from the actual peak focused position), additional refinement of the estimated peak focused position may be desired to increase the accuracy of the auto-focusing. For example, the controller determine that the contrast samples are in an "at the same side" condition (e.g., a condition in which a slope between the first marker 410 and the second marker 412 has a same sign as a slope between the second marker 412 and the third marker 414), indicating that additional refinement is likely desired.

According to the present disclosure, the slopes derived from the three contrast samples (indicated by marker 410, marker 412, and marker 414) may be used to provide additional information to refine the estimation of the peak focused position. The first derivative of a Lorentzian function may be defined as $$L'(z) = \frac{-2AH^2(z-z_0)}{\left(H^2 + (z-z_0)^2\right)^2}.$$

However, because the amplitude A and the half-width half-maximum of the contrast distribution are unknown to the controller, it may be difficult to determine $z_0$.

However, the unknown amplitude A may be canceled out by using the "normalized slope", which is the first derivative divided by the Lorentzian function itself, where the normalized slope is defined as $$\frac{L'(z)}{L(z)} = \frac{-2(z-z_0)}{H^2 + (z-z_0)^2}.$$

Although the half-width half-maximum is unknown, it may be estimated with a higher tolerance for error as compared to the amplitude A. Therefore, the peak position can be roughly estimated by the slopes between the initial three contrast samples and the "normalized slope" equation. The controller may generate the initial contrast distribution using the additional information to more accurately estimate the peak focused location. In the example shown by FIG. 4, the initial contrast distribution generated using the three contrast samples and the "normalized slope" equation is indicated by plot 450. After generating the initial contrast distribution represented by plot 450, the distance between the subject and the objective may be adjusted by the controller to position the subject at the first corrected position indicated by the horizontal position of marker 417 and a fourth contrast sample may be acquired.

With four contrast samples close to the peak focused position, the slopes previously determined may be less accurate to the actual Lorentzian curve due to the highly nonlinear nature of the curve. Therefore, the peak focused position may be estimated by using the centroid function calculated from acquired data instead, which is basically the averaged Z coordinates of the contrast samples weighted by the corresponding image contrast value such as the Brenner gradient. The peak focused position may be estimated by $$Z_c = \frac{\sum_z I(z)z}{\sum_z I(z)},$$

where $Z_c$ is the result of the centroid calculation and may be used as the initial guess of the peak location for the next curve fitting routine. The controller may model a first corrected contrast distribution indicated by plot 452 and may determine a peak of the first corrected contrast distribution, as indicated by marker 418 arranged along vertical axis 428. The position of the subject relative to the objective indicated by the horizontal position of the marker 418 may be referred to herein as a second corrected position. The contrast value indicated by the vertical position of the marker 418 may be referred to herein as a fifth contrast value. The controller may acquire a fifth contrast sample with the subject in the second corrected position. The controller may then model a second corrected contrast distribution based on the acquired contrast samples, with the second corrected contrast distribution indicated by plot 401. The peak of the second corrected contrast distribution is indicated by marker 420. The position of the subject relative to the objective indicated by the horizontal position of the marker 420 may be referred to herein as a third corrected position of the subject.

During conditions in which a large amount of noise is present in the contrast samples or the estimated value of the half-width half maximum of the Lorentzian curve is far from the appropriate value, the noise may obfuscate the identification of the actual peak focused position of the subject. In order to reduce a likelihood of identifying a false in-focus position as the actual peak focused position, an additional contrast sample may be acquired away from the estimated focused position indicated by marker 420. The additional contrast sample is indicated by sixth marker 506 aligned with vertical axis 504, as shown by FIG. 5.

FIG. 5 shows the graph 400 including plot 401 representing the second corrected contrast distribution and additionally a plot 500 representing a third corrected contrast distribution. As described above, the controller may acquire a sixth contrast sample (indicated by sixth marker 506) away from the estimated focused position indicated by marker 420. In an embodiment, the position of the subject at which the sixth contrast sample is acquired may be spaced apart from the position of the subject represented by the horizontal position of marker 420 by amount 512. The amount 512 (e.g., length) may be approximately equal to the half-width half-maximum of the contrast distribution represented by plot 401, and the direction of the adjustment may be based on the previously acquired contrast samples (e.g., in the example shown, the controller decreases the distance between the subject and the objective such that the sixth marker 506 is at a first side 520 of the plot 401, whereas the marker 410, marker 412, marker 414, and marker 418 are at an opposing, second side 522 of the plot 401 across the peak of the plot 401). Selecting the distance between the subject and the objective for acquisition of the sixth contrast sample based on the first through fifth contrast samples, such that the sixth marker 506 indicating the sixth contrast sample is at the opposite side of the plot 401 (e.g., contrast distribution) relative to the first through fourth markers, may increase an accuracy of the curve fitting routine and reduce a likelihood of peak location trapping if an initial guess of the peak focused location relies on the centroid function continuously. In particular, in the example shown, the first through fourth contrast samples are acquired by decreasing the distance between the subject and the objective, as indicated by direction 416, and the controller determines the estimated focused position corresponding to the peak of the second corrected contrast distribution (indicated by plot 401) shown by fifth marker 420 aligned with vertical axis 424. The sixth contrast sample is acquired with the subject in a position adjusted from the estimated focused position by further decreasing the distance between the subject and the objective.

In some embodiments, the controller may the actual contrast value of the sixth contrast sample to an expected contrast value of the sixth contrast sample, where the expected contrast value is determined from the second corrected contrast distribution (indicated by plot 401). In the example shown, the sixth marker 506 indicates the actual contrast value of the sixth contrast sample (e.g., the vertical position of the sixth marker 506 within graph 400 indicates the actual contrast value), and marker 508 indicates the expected contrast value of the sixth contrast sample based on the second corrected contrast distribution (e.g., marker 508 is positioned along the curve of the first contrast distribution). Because the expected contrast value of the sixth contrast sample is different from the actual contrast value (e.g., lower than the actual contrast value), as indicated by difference 530, the controller may determine that correction of the second corrected contrast distribution and the estimated focused position may increase the accuracy of the auto-focusing. As a result, using the six contrast samples, the controller may generate the third corrected contrast distribution, as indicated by plot 500. In some embodiments, the controller may generate the third corrected contrast distribution using the six contrast samples without comparing the sixth contrast value with the expected contrast value. The controller may further determine the half-width half-maximum of the third corrected contrast distribution based on the six contrast samples. The controller may determine the peak of the third corrected contrast distribution (indicated by marker 511) and identify the peak as a corrected focused position. In the view shown by FIG. 5, the peak indicated by marker 511 is intersected by vertical axis 502 and is offset from the marker 420 in the horizontal direction by difference 510. The position of the subject relative to the objective indicated by the horizontal position of marker 511 may be referred to herein as a fourth corrected position. Different optical setups and/or types of subjects to be imaged may result in a large variety of potential half-width half-maximum values of contrast distributions generated by the microscope assembly. By correcting the auto-focusing as described above, the microscope assembly may accurately auto-focus a variety of different subjects with a variety of different optical setups.

FIGS. 6A-6C show a flowchart illustrating a method 600 for microscope auto-focusing. The microscope may be similar to, or the same as, the microscope 100 described above with reference to FIG. 1. Instructions for carrying out method 600 and the rest of the methods included herein may be executed by a controller (e.g., controller 116 shown by FIG. 1 and described above) based on instructions stored on a memory of the controller and in conjunction with signals received from sensors of the system, such as the sensors described above with reference to FIG. 1. The controller may employ actuators of the system to adjust system operation, according to the methods described herein. As one example, the controller may adjust the position of a subject imaged by the microscope (e.g., subject 110 shown by FIG. 1 and described above) relative to an objective of the microscope (e.g., objective 108 shown by FIG. 1 and described above) by increasing or decreasing a distance between the subject and the objective. Increasing or decreasing the distance between the subject and the objective may include adjusting a position of a stage supporting the subject (e.g., similar to, or the same as, the stage 134 shown by FIG. 1 and described above) relative to the objective. Additionally or alternately, increasing or decreasing the distance between the subject and the objective may include adjusting a position of the objective relative to the subject and the stage. Adjusting the position of the stage may include transmitting electronic signals to an actuator configured to control the position of the stage, such as a motor (e.g., motor 170 shown schematically by FIG. 1). Adjusting the position of the objective may include transmitting electronic signals to an actuator configured to control the position of the objective (e.g., positioning device 118 shown by FIG. 1 and described above). It should be understood that the position of the subject, as described herein, refers to the distance between the subject and the objective. The actual peak focused position refers to a particular distance between the subject and the objective which results in a desired focusing of the subject by the microscope assembly.

At 602, the method includes determining microscope operating conditions.

Determining the microscope operating conditions may include determining an initial position of the subject and stage (e.g., determining an initial distance between the subject and the objective), determining an ON/OFF condition and/or intensity of a light source of the microscope, etc.

The method continues from 602 to 603 where the method includes sampling contrast at an initial position and a second position.

As described herein, sampling contrast refers to acquiring an image of the subject via the microscope and calculating the contrast of the acquired image. Calculating the contrast of the acquired image may include calculating the Brenner gradient for the acquired image, as described above, where the Brenner gradient is defined as $B_z = \Sigma_{x,y} (I(x, y+2) - I(x, y))^2$, where I is the image intensity at pixel (x, y) of the image acquired at a subject distance of Z (where the subject distance is a distance between the subject and the objective). Sampling contrast at a position, as described herein, refers to determining a contrast value of an image acquired while the subject being imaged is in a particular position. The position of the subject is in relation to the objective of the microscope. Increasing the position refers to increasing a distance between the subject and the objective, and decreasing the position refers to decreasing the distance between the subject and the objective. Sampling contrast at a particular position refers to acquiring an image of the subject with the subject at a particular distance from the objective and determining the contrast value of the acquired image.

Sampling contrast at the initial position at 603 may include, at 604, acquiring a first image with the subject in the initial position and determining a first contrast value corresponding with the initial position.

The acquisition of the first image and the determination of the first contrast value may be similar to the example described above with reference to FIG. 4, as one example. In particular, the first image may be acquired in the position along the horizontal axis indicated by the horizontal position of the first marker 410 (e.g., the distance between the subject and the objective indicated by first marker 410 in relation to the horizontal axis), and the first contrast value may be the contrast value along the vertical axis indicated by the vertical position of the first marker 410. Acquiring the first image with the subject in the initial position may include imaging the subject via an image sensor of the microscope assembly (e.g., via a detector of an auto-focus sensor of the microscope, such as the detector 114 of the auto-focus sensor 102 and/or detector 119 of auto-focus sensor 115, as described above with reference to FIG. 1).

Sampling contrast at the second position at 603 may include, at 606, adjusting the subject to the second position based on the initial position, acquiring a second image in the second position, and determining a second contrast value corresponding with the second position based on the second image.

As one example, the second position may be offset from the first position by an amount similar to the example shown by FIG. 4 and described above (e.g., amount 436 between first marker 410 and second marker 412 in the horizontal direction). In the example described herein, the second position may be a position of the subject in which the distance between the subject and the objective is smaller relative to the distance between the subject and the objective during conditions in which the subject is in the first position (e.g., similar to the example shown by FIG. 4 and described above). However, in other examples, the second position may be a position of the subject in which the distance between the subject and the objective is larger relative to the distance between the subject and the objective during conditions in which the subject is in the first position.

Acquiring the second image in the second position may include imaging the subject via the detector of the auto-focus sensor of the microscope (e.g., the detector 114 of the auto-focus sensor 102 and/or detector 119 of auto-focus sensor 115, as described above with reference to FIG. 1), similar to the example described above. Determining the second contrast value corresponding with the second position based on the second image may include calculating the contrast value of the second image, similar to the example described above. The contrast value of the second image may be higher than the contrast value of the first image during some conditions, similar to the example shown by FIG. 4 (e.g., the contrast value of the second contrast sample indicated by second marker 412 is higher than the contrast value of the first contrast sample indicated by first marker 410, as illustrated by the second marker 412 being vertically higher than the first marker 410).

The method continues from 603 to 607 where the method includes sampling contrast at a third position, based on the initial position and the second position.

The controller may determine the third position based on a difference between the sampled contrast in the initial position (which may be referred to herein as the first position) and the sampled contrast in the second position, in some embodiments. For example, the controller samples contrast with the subject in the initial position and then samples contrast with the subject in the second position, as described above. The controller determines the contrast value of the image acquired while sampling contrast with the subject in the initial position, and the controller determines the contrast value of the image acquired while sampling contrast with the subject in the second position. The contrast value associated with the initial position may be referred to as the first contrast value, and the contrast value associated with the second position may be referred to as the second contrast value.

To determine the third position, the controller may compare the first contrast value to the second contrast value. The comparison may include determining a difference between the first contrast value and the second contrast value (e.g., determining whether the second contrast value is greater than the first contrast value). The controller may compare the difference between the first contrast value and the second contrast value with a difference between the initial position (e.g., the distance between the subject and the objective with the subject in the initial position) and the second position (e.g., the distance between the subject and the objective with the subject in the second position) in order to determine the third position.

As one example, during conditions in which the second contrast value is higher than the first contrast value and the subject is closer to the objective while in the second position compared to conditions in which the subject is in the initial position (e.g., similar to the example shown by FIG. 4), the controller may determine that positioning the subject closer to the objective may increase the focusing of the subject. As a result, the controller may determine the third position of the subject to be closer to the objective compared to the distance between the subject and the objective while the subject is in the second position.

As another example, during conditions in which the second contrast value is higher than the first contrast value and the subject is further from the objective while in the second position compared to conditions in which the subject is in the initial position, the controller may determine that positioning the subject further from the objective may increase the focusing of the subject. As a result, the controller may determine the third position of the subject to be further from the objective compared to the distance between the subject and the objective while the subject is in the second position.

As another example, during conditions in which the second contrast value is lower than the first contrast value and the subject is closer to the objective while in the second position compared to conditions in which the subject is in the initial position, the controller may determine that positioning the subject further from the objective may increase the focusing of the subject. As a result, the controller may determine the third position of the subject to be further from the objective compared to the distance between the subject and the objective while the subject is in the second position.

As another example, during conditions in which the second contrast value is lower than the first contrast value and the subject is further from the objective while in the second position compared to conditions in which the subject is in the initial position, the controller may determine that positioning the subject closer to the objective may increase the focusing of the subject. As a result, the controller may determine the third position of the subject to be closer to the objective compared to the distance between the subject and the objective while the subject is in the second position.

Sampling contrast at the third position based on the initial position and the second position at 607 may include, at 608, adjusting the subject to the third position, acquiring a third image in the third position, and determining a third contrast value corresponding with the third position based on the third image.

Acquiring the third image in the third position includes imaging the subject (e.g., via the detector of the auto-focus sensor of the microscope assembly, such as the detector 114 of the auto-focus sensor 102 and/or detector 119 of auto-focus sensor 115, as described above with reference to FIG. 1). The third contrast value may be determined based on the third image similar to the examples described above with reference to the contrast value determined for the second image in the second position and the contrast value determined for the first image in the initial position. The first contrast sample (e.g., the contrast sample acquired with the subject in the initial position), the second contrast sample (e.g., the contrast sample acquired with the subject in the second position), and the third contrast sample (e.g., the contrast sample acquired with the subject in the third position) may be referred to collectively as a first group of contrast samples.

The method continues from 607 to 610 where the method includes modeling an initial contrast distribution and determining a first corrected position based on the sampled contrast at the initial position, the second position, and the third position. The initial contrast distribution may be similar to, or the same as, the contrast distribution represented by plot 450 shown by FIGS. 4-5, as one example.

Modeling the initial contrast distribution and determining the first corrected position at 610 may include, at 612, calculating a slope set based on the first contrast value and the initial position, the second contrast value and the second position, and the third contrast value and the third position, and determining parameters of the initial contrast distribution based on the slope set via a normalized slope equation.

Calculating the slope set may include comparing the first contrast value, the second contrast value, and the third contrast value, and determining which of the first contrast value, the second contrast value, and the third contrast value has the highest value (e.g., the greatest amount of contrast). As one example, the first contrast value may be the contrast value indicated by the vertical position of marker 410 shown by FIG. 4, the second contrast value may be the contrast value indicated by the vertical position of marker 412 shown by FIG. 4, and the third contrast value may be the contrast value indicated by the vertical position of marker 414 shown by FIG. 4. The controller may compare the three contrast values and determine that the third contrast value is higher (e.g., a greater numerical contrast value) than each of the first contrast value and the second contrast value. The controller may then calculate a slope between the contrast value having the highest value (e.g., the third contrast value) and each of the other contrast values (e.g., the first contrast value and the second contrast value). The slope between two contrast values, as described herein, refers to a difference between the values of the two contrast values divided by a difference between the position coordinates at which the contrast values were acquired. As one non-limiting example, the slope between the third contrast value and the second contrast value may be defined as $$m = \frac{I_3 - I_2}{z_3 - z_2},$$

where m is the slope, $I_3$ is the value of the third contrast value, $I_2$ is the value of the second contrast value, $z_3$ is the coordinate position of the subject relative to the objective at which the third contrast value was acquired (e.g., the horizontal position of marker 414 shown by FIG. 4, where the horizontal position represents distance between the subject and the objective), and $z_2$ is the coordinate position of the subject relative to the objective at which the second contrast value was acquired (e.g., the horizontal position of marker 412 shown by FIG. 4).

The normalized slope equation may be similar to, or the same as, the normalized slope equation described above with reference to FIGS. 4-5 (e.g., where the normalized slope is defined as $$\frac{L'(z)}{L(z)} = \frac{-2(z - z_0)}{H^2 + (z - z_0)^2}).$$

Determining parameters of the initial contrast distribution based on the slope set via the normalized slope equation may include calculating the peak position of the curve (e.g., Lorentzian curve) of the initial contrast distribution via the normalized slope equation. The controller may estimate the half-width half-maximum H of the curve of the initial contrast distribution to model the curve of the initial contrast distribution such that the first contrast value, second contrast value, and third contrast value are values defining the curvature of the curve (e.g., similar to marker 410, marker 412, and marker 414 shown by FIGS. 4-5 indicating contrast values included by the contrast distribution represented by plot 450).

The method continues from 610 to 614 where the method includes determining whether all of the slopes of the slope set are positive or whether all of the slopes of the slope set are negative. For example, the controller may compare the slope between the third contrast value and the second contrast value to the slope between the third contrast value and the first contrast value. If the slope between the third contrast value and the second contrast value is positive and the slope between the third contrast value and the first contrast value is positive, the controller determines that all slopes of the slope set are positive. However, if the slope between the third contrast value and the second contrast value is positive and the slope between the third contrast value and the first contrast value is negative, the controller determines that all of the slopes of the slope set are not positive and all of the slopes of the slope set are not negative. As another example, if the slope between the third contrast value and the second contrast value is negative and the slope between the third contrast value and the first contrast value is negative, the controller determines that all slopes of the slope set are negative. However, if the slope between the third contrast value and the second contrast value is negative and the slope between the third contrast value and the first contrast value is positive, the controller determines that all of the slopes of the slope set are not positive and all of the slopes of the slope set are not negative.

If all of the slopes of the slope set are not positive and all of the slopes of the slope set are not negative at 614, the method continues from 614 to 621 where the method includes adjusting the subject to the first corrected position and maintaining the subject in the first corrected position.

Because all of the slopes of the slope set are not positive and all of the slopes of the slope set are not negative, the controller may determine that the actual peak focused position of the subject is located between at least two of the initial position (e.g., the position of the subject corresponding with the first contrast value), the second position (e.g., the position of the subject corresponding with the second contrast value), and the third position (e.g., the position of the subject corresponding with the third contrast value. For example, the peak focused position may be between the initial position and the second position, between the initial position and the third position, or between the second position and the third position. Due to the peak focused position being relatively close to the initial position, second position, and third position (e.g., relative to examples in which the peak focused position is not between at least two of the initial position, the second position, and the third position), the controller may determine that the position corresponding to the peak of the initial contrast distribution (e.g., the first corrected position) is approximately equal to the actual peak focused position of the subject. By adjusting the subject to the first corrected position and maintaining the subject at the first corrected position, the subject may be sufficiently focused for imaging (e.g., for analysis via a technician observing the subject via the microscope assembly).

However, if all of the slopes of the slope set are positive or all of the slopes of the slope set are negative at 614, the method continues from 614 to 616 where the method includes sampling contrast at the first corrected position.

Because all of the slopes of the slope set are positive or all of the slopes of the slope set are negative, the controller may determine that the actual peak focused position of the subject is not between at least two of the initial position, the second position, and the third position. Therefore, in order to adjust the subject toward the actual peak focused position, the controller continues to acquire contrast samples to more accurately estimate or identify the actual peak focused position as described below.

Sampling contrast at the first corrected position at 616 may include, at 618, adjusting the subject to the first corrected position, acquiring a fourth image in the first corrected position, and determining a fourth contrast value corresponding with the first corrected position based on the fourth image. Determining the fourth contrast value may include calculating the Brenner gradient of the fourth image, similar to the examples described above. In one example, the first corrected position may be the position along the horizontal axis indicated by marker 417 shown by FIGS. 4-5, and the fourth contrast value may be represented by the vertical position of the marker 417 (e.g., the position along the vertical axis corresponding to the vertical position of the marker 417).

The method continues from 618 to 620 (shown by FIG. 6B) where the method includes modeling a first corrected contrast distribution based on each of the first contrast value, the second contrast value, the third contrast value, and the fourth contrast value and the initial position, the second position, the third position, and the first corrected position.

In one example, the first corrected contrast distribution may be similar to, or the same as, the contrast distribution represented by plot 452 in FIGS. 4-5. The first corrected contrast distribution may be modeled (e.g., calculated) using the Lorentzian curve function, $$L(z) = \frac{A}{1 + \left(\frac{z - z_0}{H}\right)^2},$$

similar to the example described above with reference to the initial contrast distribution. However, in modeling the first corrected contrast distribution, additional data is available to the controller for the calculation of the first corrected contrast distribution relative to the initial contrast distribution. In particular, because the controller has determined the first, second, third, and fourth contrast values and the contrast values are included in the calculation of the first corrected contrast distribution, an accuracy of the first corrected contrast distribution may be increased relative to an accuracy of the initial contrast distribution (e.g., the peak of the first corrected contrast distribution may more accurately represent the actual peak focused position of the subject relative to the peak of the initial contrast distribution).

Modeling the first corrected contrast distribution includes, at 622, determining a second corrected position corresponding with a modeled peak contrast value of the first corrected contrast distribution. The second corrected position is the position indicated by the peak of the first corrected contrast distribution. In one example, the second corrected position may be the position along the horizontal axis indicated by marker 418 shown by FIGS. 4-5 and described above.

Determining the second corrected position at 622 may include, at 624, calculating the second corrected position via a weighted average of the first contrast value, the second contrast value, the third contrast value, and the fourth contrast value, and the corresponding positions. The controller uses the weighted average of the contrast values to calculate the first corrected contrast distribution, where the weighted average may be an average of the initial position, second position, third position, and fourth position weighted by the intensity of the respective contrast samples acquired in each position (e.g., the first contrast value, the second contrast value, the third contrast value, and the fourth contrast value, respectively). The weighted average may be defined by a centroid function, similar to the example described above. In particular, the peak of the first corrected contrast distribution may be determined via the centroid function, $$Z_c = \frac{\sum_z I(z)z}{\sum_z I(z)},$$

where $Z_c$ is the peak position of the first corrected contrast distribution, and I(z) is the intensity of the contrast (e.g., contrast value, calculated via the Brenner gradient) at a given position z. As one example, I(z) at the initial position may be equal to the value of the first contrast value, I(z) at the second position may be equal to the value of the second contrast value, etc.

The method continues from 622 to 626 where the method includes determining whether a termination condition has been satisfied. In some embodiments, the termination condition may be a condition in which a subject position associated with a peak of a modeled curve (e.g., contrast distribution) generated by the microscope assembly is within a threshold range (e.g., threshold distance) of an actual peak focused position of the subject (e.g., conditions in which the peak of the modeled curve is within 0.3 micrometers of the actual peak focused position). The threshold range may be based on a resolution of mechanical movement of the motorized stage of the microscope assembly (e.g., in configurations in which the stage of the microscope assembly may be adjusted by a minimum amount of 0.25 micrometers, the threshold range may be 0.3 micrometers).

At 626, the controller may determine whether the termination condition has been satisfied by comparing the first corrected position with the second corrected position. If the second corrected position is offset from the first corrected position by an amount (e.g., a distance) less than the resolution of mechanical movement of the motorized stage of the microscope assembly, the controller may determine that the termination condition has been satisfied. During such conditions, the controller may determine that adjusting the subject from the first corrected position to the second corrected position may not increase the focusing of the subject due to the second corrected position being sufficiently close to the first corrected position. However, if the second corrected position is offset from the first corrected position by an amount greater than the resolution of mechanical movement of the motorized stage of the microscope assembly, the controller may determine that the termination condition has not been satisfied. During such conditions, the controller may determine that adjusting the subject from the first corrected position to the second corrected position may increase the focusing of the subject.

If the termination condition has been satisfied at 626, the method continues from 626 to 628 where the method includes maintaining the subject at the first corrected position. Maintaining the subject at the first corrected position may include not adjusting the position of the subject throughout imaging of the subject (e.g., during analysis, observation, etc. of the subject by a technician via the microscope assembly). As described above, during such conditions, the subject may be sufficiently focused at the first corrected position for imaging.

However, if the termination condition has not been satisfied at 626, the method continues from 626 to 630 where the method includes sampling contrast at the second corrected position.

Sampling contrast at the second corrected position at 630 may include, at 632, adjusting the subject to the second corrected position, acquiring a fifth image in the second corrected position, and determining a fifth contrast value corresponding with the second corrected position based on the fifth image. Determining the fifth contrast value may include calculating the Brenner gradient of the fifth image, similar to the examples described above. As described above, in one example, the second corrected position may be the position along the horizontal axis indicated by marker 418 shown by FIGS. 4-5, with the fifth contrast value represented by the vertical position of the marker 418 (e.g., the position along the vertical axis corresponding to the vertical position of the marker 418).

The method continues from 630 to 634 where the method includes modeling a second corrected contrast distribution based on each of the first contrast value, the second contrast value, the third contrast value, the fourth contrast value, and the fifth contrast value, and the initial position, the second position, the third position, the first corrected position, and the second corrected position.

In one example, the second corrected contrast distribution may be similar to, or the same as, the contrast distribution represented by plot 401 in FIGS. 4-5. The second corrected contrast distribution may be modeled (e.g., calculated) using the Lorentzian curve function, $$L(z) = \frac{A}{1 + \left(\frac{z - z_0}{H}\right)^2},$$

similar to the example described above with reference to the first corrected contrast distribution. However, in modeling the second corrected contrast distribution, additional data is available to the controller for the calculation of the second corrected contrast distribution relative to the first corrected contrast distribution. In particular, because the controller has determined the first, second, third, fourth, and fifth contrast values and the contrast values are included in the calculation of the second corrected contrast distribution, an accuracy of the second corrected contrast distribution may be increased relative to an accuracy of the first corrected contrast distribution (e.g., the peak of the second corrected contrast distribution may more accurately represent the actual peak focused position of the subject relative to the peak of the first corrected contrast distribution).

Modeling the second corrected contrast distribution at 634 includes, at 636, determining a third corrected position corresponding with a modeled peak contrast value of the second corrected contrast distribution. The third corrected position is the position indicated by the peak of the second corrected contrast distribution. In one example, the third corrected position may be the position along the horizontal axis indicated by marker 420 shown by FIGS. 4-5 and described above. Modeling the second corrected contrast distribution may include using a weighted average of each of the determined contrast values (e.g., where the weighted average is defined by the centroid function), similar to the example described above.

The method continues from 636 to 638 where the method includes determining whether the termination condition has been satisfied. As described above, the termination condition may be a condition in which a subject position associated with a peak of a modeled curve (e.g., contrast distribution) generated by the microscope assembly is within a threshold range of an actual peak focused position of the subject (e.g., conditions in which the peak of the modeled curve is within 0.3 micrometers of the actual peak focused position). The threshold range may be based on a resolution of mechanical movement of the motorized stage of the microscope assembly (e.g., in configurations in which the stage of the microscope assembly may be adjusted by a minimum amount of 0.25 micrometers, the threshold range may be 0.3 micrometers).

At 638, the controller may determine whether the termination condition has been satisfied by comparing the third corrected position with the second corrected position. If the third corrected position is offset from the second corrected position by an amount (e.g., a distance) less than the resolution of mechanical movement of the motorized stage of the microscope assembly, the controller may determine that the termination condition has been satisfied. During such conditions, the controller may determine that adjusting the subject from the second corrected position to the third corrected position may not increase the focusing of the subject due to the third corrected position being sufficiently close to the second corrected position. However, if the third corrected position is offset from the second corrected position by an amount greater than the resolution of mechanical movement of the motorized stage of the microscope assembly, the controller may determine that the termination condition has not been satisfied. During such conditions, the controller may determine that adjusting the subject from the second corrected position to the third corrected position may increase the focusing of the subject.

If the termination condition has been satisfied at 638, the method continues to 640 where the method includes maintaining the subject at the second corrected position. Maintaining the subject at the second corrected position may include not adjusting the position of the subject throughout imaging of the subject (e.g., during analysis, observation, etc. of the subject by a technician via the microscope assembly). As described above, during such conditions, the subject may be sufficiently focused at the second corrected position for imaging.

However, if the termination condition is not satisfied at 638, the method continues from 638 to 642 (shown by FIG. 6C) where the method includes sampling contrast at a probing position, based on the initial position, the second position, the third position, the first corrected position, the second corrected position, and the third corrected position. In one example, the probing position may be the horizontal position of the marker 506 shown by FIG. 5 and described above (e.g., the position along the horizontal axis corresponding to the horizontal position of the marker 506). The contrast sample acquired with the subject in the probing position may be referred to herein as a probing contrast sample.

Sampling contrast at the probing position may include, at 644, determining the probing position based on the second corrected contrast distribution and the third corrected position. In some examples, the controller may determine the probing position based on a width of the curve (e.g., Lorentzian curve) of the second corrected contrast distribution and the third corrected position. As one example, the controller may calculate the full-width at half-maximum (FWHM) of the curve of the second corrected contrast distribution, and the controller may select the probing position as a position offset from the third corrected position by an amount equal to the FWHM. For example, FIG. 5 shows marker 420 and marker 506, where the horizontal position of marker 420 (e.g., the location of the marker 420 in the direction parallel to the horizontal axis) may represent the third corrected position and the horizontal position of marker 506 may represent the probing position. The marker 506 is horizontally offset from the marker 420 by amount 512, where amount 512 is equal to the FWHM. In some examples, the marker 506 may be horizontally offset from the marker 420 by a different amount (e.g., a half-width at half-maximum of the curve of the second corrected contrast distribution). In the example shown by FIG. 5, the marker 506 is offset from the marker 420 horizontally to the left of the marker 420, such that the distance between the subject and the objective is decreased in the position indicated by marker 506 relative to the distance between the subject and the objective in the position indicated by marker 420. In other conditions, however, the probing position may be offset in the opposite direction relative to the third corrected position (e.g., such that the probing position is a position in which the distance between the subject and the objective is greater relative to the distance between the subject and the objective during conditions in which the subject is in the third corrected position).

The horizontal direction in which the probing position is offset from the third corrected position may be determined based on a difference between the third corrected position and the second corrected position. In the example shown by FIG. 5, the marker 420 is offset horizontally to the left of the marker 418, where marker 420 may represent the third corrected position and marker 418 may represent the second corrected position. In the example, the distance between the subject and the objective is less during conditions in which the subject is in the third corrected position relative to the distance between the subject and the objective during conditions in which the subject is in the second corrected position. Because the focusing of the subject is increased during conditions in which the subject is in the third corrected position relative to the focusing of the subject during conditions in which the subject is in the second corrected position, the controller may select the probing position to be a position of the subject in which the distance between the subject and the objective is further decreased relative to conditions in which the subject is in the third corrected position (e.g., marker 506 may represent the probing position with the marker 506 arranged horizontally to the left of the marker 420 as described above). However, in examples in which the distance between the subject and the objective during conditions in which the subject is in the third corrected position is larger than the distance between the subject and the objective during conditions in which the subject is in the second corrected position, the controller may select the probing position to be a position of the subject in which the distance between the subject and the objective is further increased relative to conditions in which the subject is in the third corrected position. Further, in some examples, the probing position may be offset from the third corrected position by a different amount (e.g., an amount equal to a half-width half-maximum of the curve of the second corrected contrast distribution).

Sampling contrast at the probing position may include, at 646, adjusting the subject to the probing position, acquiring a sixth image in the probing position, and determining a sixth contrast value corresponding with the probing position based on the sixth image. In one example, the sixth contrast value may be represented by the vertical position of the marker 506 shown by FIG. 5 and described above (e.g., the position along the vertical axis corresponding to the vertical position of the marker 506). The sixth contrast value may be determined by the controller based on the sixth image by calculating the Brenner gradient for the sixth image, similar to the examples described above.

The method continues from 642 to 648 where the method includes modeling a third corrected contrast distribution based on each of the first contrast value, the second contrast value, the third contrast value, the fourth contrast value, the fifth contrast value, and the sixth contrast value, and the initial position, the second position, the third position, the first corrected position, the second corrected position, and the third corrected position.

In one example, the third corrected contrast distribution may be similar to, or the same as, the contrast distribution represented by plot 500 in FIG. 5. The third corrected contrast distribution may be modeled (e.g., calculated) using the Lorentzian curve function, $$L(z) = \frac{A}{1 + \left(\frac{z - z_0}{H}\right)^2},$$

similar to the example described above with reference to the second corrected contrast distribution. However, in modeling the third corrected contrast distribution, additional data is available to the controller for the calculation of the third corrected contrast distribution relative to the second corrected contrast distribution. In particular, because the controller has determined the first, second, third, fourth, fifth, and sixth contrast values and the contrast values are included (and the FWHM parameter, H, may be adjusted) in the calculation of the third corrected contrast distribution, an accuracy of the third corrected contrast distribution may be increased relative to an accuracy of the second corrected contrast distribution (e.g., the peak of the third corrected contrast distribution may more accurately represent the actual peak focused position of the subject relative to the peak of the second corrected contrast distribution). In particular, by determining the sixth contrast value via the sixth image acquired with the subject in the probing position, the controller increases a likelihood of accurate determination of the actual peak focused position of the subject. For example, during conditions in which a signal-to-noise ratio of images of the subject acquired by the microscope assembly is low, it may be more difficult for the controller to accurately identify the actual peak focused position of the subject (e.g., image noise and/or aberrations may result in a decreased accuracy of the determined contrast values, which may result in decreased accuracy of focusing of the subject). As a result, it is possible that the values of the contrast values calculated by the controller may be undesirably affected by the amount of noise in the images acquired by the microscope assembly (e.g., high amounts of noise may undesirably increase or decrease the calculated contrast value separately from the focusing of the subject). For example, in determining the fourth contrast value, the fourth image may have an increased amount of noise relative to the third image. The increased amount of noise may result in an artificially increased or decreased value of the fourth contrast value, which may undesirably reduce an accuracy of the adjustment of the subject toward the peak focused position. However, by sampling contrast at the probing position, the value of the sixth contrast value may be sufficiently different from the value of each of the other contrast values to increase the accuracy of the modeled contrast distribution (e.g., the third corrected contrast distribution) and reduce a likelihood of undesired adjustment of the subject away from the peak focused position and/or toward a false focused position.

Modeling the third corrected contrast distribution at 648 includes, at 650, determining a fourth corrected position corresponding with a modeled peak contrast value of the third corrected contrast distribution. In one example, the fourth corrected position may be the position along the horizontal axis indicated by marker 511 along plot 500 shown by FIG. 5 and described above.

The method continues from 650 to 652 where the method includes adjusting the subject to the fourth corrected position and maintaining the subject at the fourth corrected position. Adjusting the subject to the fourth corrected position includes adjusting the position of the stage supporting the subject to move the subject to the fourth corrected position. After adjusting the subject to the fourth corrected position, maintaining the subject at the fourth corrected position may include not adjusting the position of the subject throughout imaging of the subject (e.g., during analysis, observation, etc. of the subject by a technician via the microscope assembly).

As a result of the sampling of the contrast at the probing position, the additional information provided to the controller (e.g., the sixth contrast value) increases a likelihood that the fourth corrected position is approximately equal to the actual peak focused position. For example, by adjusting the position of the subject and acquiring the contrast samples as described above, the controller may reliably determine that the fourth corrected position is offset from the peak focused position by less than the resolution of mechanical movement of the stage of the microscope assembly (e.g., the controller may accurately select the fourth corrected position to be less than 0.3 micrometers from the peak focused position). As a result, the fourth corrected position is effectively the position in which the focusing of the subject is at a maximum for a given configuration of the microscope assembly (e.g., for a given resolution of mechanical movement of the stage of the microscope assembly) such that the subject is equally focused while in the fourth corrected position as compared to the peak focused position (e.g., the amount of focusing of the subject while the subject is in the fourth corrected position is the same as if the subject were in the peak focused position). In this way, the subject may be focused more accurately and reliably by the microscope assembly.

In this way, by configuring the microscope assembly as described above and controlling the microscope assembly as described above, the microscope assembly may more quickly and accurately perform auto-focusing of the subject. An efficiency of the auto-focusing may be increased, which may increase productivity. Further, by controlling the microscope assembly to sample contrast with the subject in the probing position, the focusing of the subject may be verified and a likelihood of maintaining the subject in a non-focused position may be reduced.

The disclosure also provides support for a method for microscope auto-focusing, comprising: acquiring a plurality of contrast samples of an imaged subject, modeling a contrast distribution based on the plurality of contrast samples, acquiring an additional contrast sample based on the contrast distribution, modeling a corrected contrast distribution based on the additional contrast sample and the plurality of contrast samples, and focusing the imaged subject based on the corrected contrast distribution. In a first example of the method, the method further comprises: acquiring a probing contrast sample based on the corrected contrast distribution by: determining a probing position based on the corrected contrast distribution, where the probing position is offset from a peak position of the corrected contrast distribution, and adjusting the imaged subject to the probing position. In a second example of the method, optionally including the first example, the probing position is offset from the peak position of the contrast distribution by a half-width at half-maximum (HWHM) or full-width at half-maximum of the corrected contrast distribution. In a third example of the method, optionally including one or both of the first and second examples, the method further comprises: determining a position of the imaged subject for acquisition of the additional contrast sample based on calculated slopes between contrast samples of the plurality of contrast samples. In a fourth example of the method, optionally including one or more or each of the first through third examples, the calculated slopes include a first slope calculated between a first contrast sample of the plurality of contrast samples and a second contrast sample between the plurality of contrast samples, and a second slope calculated between the first contrast sample and a third contrast sample of the plurality of contrast samples. In a fifth example of the method, optionally including one or more or each of the first through fourth examples, modeling the corrected contrast distribution based on the additional contrast sample and the plurality of contrast samples includes determining a weighted average of the additional contrast sample and the plurality of contrast samples and determining a peak of the corrected contrast distribution based on the weighted average. In a sixth example of the method, optionally including one or more or each of the first through fifth examples, determining the peak of the contrast distribution based on the weighted average includes calculating the peak via a centroid function. In a seventh example of the method, optionally including one or more or each of the first through sixth examples, the method further comprises: determining whether a termination condition has been satisfied based on the plurality of contrast samples and the additional contrast sample, and responsive to determining that the termination condition has been satisfied, adjusting the imaged subject to a corrected position or maintaining the imaged subject at the corrected position, where the corrected position is based on a peak of the corrected contrast distribution. In an eighth example of the method, optionally including one or more or each of the first through seventh examples, the termination condition includes determining whether a distance between a position of the imaged subject while acquiring the additional contrast sample and a position of the imaged subject while acquiring any contrast sample of the plurality of contrast samples is less than a threshold distance. In a ninth example of the method, optionally including one or more or each of the first through eighth examples, the threshold distance is based on a resolution of mechanical movement of a motorized stage supporting the imaged subject. In a tenth example of the method, optionally including one or more or each of the first through ninth examples, acquiring the plurality of contrast samples includes: acquiring a first contrast sample with the imaged subject in an initial position, adjusting the imaged subject to a second position and acquiring a second contrast sample with the imaged subject in the second position, and adjusting the imaged subject to a third position and acquiring a third contrast sample with the imaged subject in the third position.

The disclosure also provides support for a method for microscope auto-focusing, comprising: acquiring a first group of contrast samples of a subject, modeling a first contrast distribution based on the first group of contrast samples, determining a first corrected position of the subject based on the first contrast distribution, and adjusting the subject to the first corrected position. In a first example of the method, determining the first corrected position of the subject includes calculating the first corrected position via a normalized slope equation using the first group of contrast samples. In a second example of the method, optionally including the first example, the first group of contrast samples includes a first contrast sampled acquired with the subject in a first position, a second contrast sample acquired with the subject in a second position, and a third contrast sample with the subject in a third position, and further comprising acquiring a fourth contrast sample with the subject in the first corrected position. In a third example of the method, optionally including one or both of the first and second examples, the method further comprises: modeling a second contrast distribution based on the first group of contrast samples and the fourth contrast sample, and determining a second corrected position based on the second contrast distribution. In a fourth example of the method, optionally including one or more or each of the first through third examples, determining the second corrected position based on the second contrast distribution includes calculating the second corrected position based on a weighted average of the fourth contrast sample and each contrast sample of the first group of contrast samples. In a fifth example of the method, optionally including one or more or each of the first through fourth examples, the method further comprises: acquiring a fifth contrast sample with the subject in the second corrected position, determining whether a termination condition has been satisfied based on the fifth contrast sample, and responsive to determining that the termination condition has not been satisfied: adjusting the subject to a probing position based on the second contrast distribution, acquiring a sixth contrast sample with the subject in the probing position, and focusing the subject based on the sixth contrast sample.

The disclosure also provides support for a system, comprising: a microscope assembly including an objective and a stage configured to support a subject to be imaged, and a controller with computer readable instructions stored on non-transitory memory that when executed, cause the controller to: acquire a plurality of contrast samples of an imaged subject, model a contrast distribution based on the plurality of contrast samples, acquire an additional contrast sample based on the contrast distribution, model a corrected contrast distribution based on the additional contrast sample and the plurality of contrast samples, and focus the imaged subject based on the corrected contrast distribution. In a first example of the system, each contrast sample of the plurality of contrast samples is defined by a respective position of the stage and a respective contrast value, and further comprising instructions stored on the non-transitory memory of the controller that when executed, cause the controller to: define a peak of the contrast distribution by: determining an average of the respective position defining each contrast sample weighted by an intensity of each contrast sample, or determining slopes between a first contrast sample of the plurality of contrast samples and each of at least two other contrast samples of the plurality of contrast samples. In a second example of the system, optionally including the first example, the system further comprises: instructions stored on the non-transitory memory of the controller that when executed, cause the controller to: acquire a probing contrast sample based on the corrected contrast distribution by: determining a probing position based on the corrected contrast distribution, where the probing position is offset from a peak position of the corrected contrast distribution, and adjusting the imaged subject to the probing position.

Note that the example control and estimation routines included herein can be used with various system configurations. The control methods and routines disclosed herein may be stored as executable instructions in non-transitory memory and may be carried out by the control system including the controller in combination with the various sensors, actuators, and other system hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the control system, where the described actions are carried out by executing the instructions in a system including the various hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to other microscope types. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for auto-focusing a microscope, comprising:
measuring a first focus of the microscope relative to a subject in an initial position, including performing a first direct measurement of the first focus from image content acquired with the microscope while the subject is in the initial position;
moving the subject by a first amount from the initial position to a second position, and measuring a second focus of the microscope relative to the subject in the second position, including performing a second direct measurement of the second focus from image content acquired with the microscope while the subject is in the second position;
moving the subject by a second amount from the second position to a third position, where the third position is based on a difference between the measured first focus and the measured second focus, and measuring a third focus of the microscope relative to the subject in the third position, including performing a third direct measurement of the third focus from image content acquired with the microscope while the subject is in the third position; and
moving the subject by a third amount from the third position to a fourth position, where the fourth position is determined via a modeled curve including the measured first focus, the measured second focus, and the measured third focus.

2. The method of claim 1, wherein moving the subject by the second amount from the second position to the third position includes moving the subject in a first direction by the second amount if the difference between the measured first focus and the measured second focus is positive, and moving the subject in an opposing, second direction by the second amount if the difference between the measured first focus and the measured second focus is negative.

3. The method of claim 1, wherein the first amount and the second amount are equal.

4. The method of claim 1, wherein the second amount is equal to twice the first amount, and a direction of the movement of the subject by the first amount is opposite to a direction of the movement of the subject by the second amount.

5. The method of claim 1, wherein the third amount is different than each of the first amount and the second amount.

6. The method of claim 1, wherein moving the subject comprises adjusting a spacing between the subject and a microscope lens of the microscope by moving a stage supporting the subject toward the microscope lens or away from the microscope lens, and wherein each of the first direct measurement, the second direct measurement, and the third direct measurement includes measuring image contrast of the respective image content.

7. The method of claim 1, wherein the modeled curve is a Lorentzian function of the initial position and the measured first focus, the second position and the measured second focus, and the third position and the measured third focus, and wherein each of the first direct measurement, the second direct measurement, and the third direct measurement includes measuring high-frequency components of the respective image content.

8. A method for auto-focusing a microscope, comprising:
sequentially acquiring a first contrast measurement, a second contrast measurement, and a third contrast measurement of image content of a subject acquired with the microscope, with the subject spaced apart from a microscope lens of the microscope by a first amount, a second amount, and a third amount, respectively; and
adjusting the spacing between the subject and the microscope lens to a fourth amount based on the first contrast measurement, the second contrast measurement, and the third contrast measurement, where the fourth amount of spacing between the subject and the microscope lens is within a threshold range of a spacing providing a peak focusing of the subject through the microscope lens.

9. The method of claim 8, wherein a difference between the fourth amount of spacing and the spacing providing the peak focusing of the subject through the microscope lens is less than a minimum mechanical movement of a microscope stage supporting the subject.

10. The method of claim 8, wherein the threshold range is based on a resolution of mechanical movement of a microscope stage supporting the subject.

11. The method of claim 8, wherein the threshold range is +/−0.3 micrometers.

12. The method of claim 8, wherein adjusting the spacing between the subject and the microscope lens to the fourth amount occurs immediately after acquiring the third contrast measurement.

13. The method of claim 8, wherein adjusting the spacing between the subject and the microscope lens to the fourth amount based on the first contrast measurement, the second contrast measurement, and the third contrast measurement includes determining the fourth amount of spacing via a Lorentzian function of the first contrast measurement, the second contrast measurement, and the third contrast measurement.

14. The method of claim 8, wherein acquiring the first contrast measurement of the subject with the subject spaced apart from the microscope lens by the first amount includes calculating a Brenner gradient of an image of the subject acquired while the subject is spaced apart from the microscope lens by the first amount.

15. The method of claim 8, wherein sequentially acquiring the first contrast measurement, the second contrast measurement, and the third contrast measurement of the image content of the subject acquired with the microscope, with the subject spaced apart from the microscope lens of the microscope by the first amount, the second amount, and the third amount, respectively, includes:
   first, acquiring the first contrast measurement of the image content of the subject acquired with the microscope while the subject is spaced apart from the microscope lens by the first amount;
   then, increasing or decreasing the spacing between the subject and the microscope lens from the first amount until the spacing is equal to the second amount, and acquiring the second contrast measurement of the image content of the subject acquired with the microscope while the subject is spaced apart from the microscope lens by the second amount; and
   then, increasing or decreasing the spacing between the subject and the microscope lens from the second amount until the spacing is equal to the third amount, and acquiring the third contrast measurement of the image content of the subject acquired with the microscope while the subject is spaced apart from the microscope lens by the third amount.

16. The method of claim 8, wherein adjusting the spacing between the subject and the microscope lens to the fourth amount includes moving the subject in a first direction to increase the spacing to the fourth amount or moving the subject in a second direction to decrease the spacing to the fourth amount based on a difference between the third contrast measurement and the second contrast measurement or the first contrast measurement.

17. A system, comprising:
   a microscope assembly including a microscope lens and a stage configured to support a subject to be imaged; and
   a controller with computer readable instructions stored on non-transitory memory that when executed, cause the controller to:
      sequentially acquire a first contrast measurement, a second contrast measurement, and a third contrast measurement of image content of the subject acquired with the microscope assembly, with the subject spaced apart from the microscope lens by a first amount, a second amount, and a third amount, respectively; and
      adjust the spacing between the subject and the microscope lens to a fourth amount based on the first contrast measurement, the second contrast measurement, and the third contrast measurement, where the fourth amount of spacing between the subject and the microscope lens is within a threshold range of a spacing providing a peak focusing of the subject through the microscope lens.

18. The system of claim 17, further comprising instructions stored on non-transitory memory that when executed, cause the controller to:
   model a curve based on the first contrast measurement, the second contrast measurement, and the third contrast measurement, and determine the fourth amount of spacing between the subject and the microscope lens based on the modeled curve.

19. The system of claim 18, wherein the modeled curve is a Lorentzian function of the first contrast measurement, the second contrast measurement, and the third contrast measurement.

20. The system of claim 17, wherein a difference between the fourth amount of spacing and the spacing providing the peak focusing of the subject through the microscope lens is less than a minimum mechanical movement of the stage supporting the subject.

\* \* \* \* \*